(12) United States Patent
Chan et al.

(10) Patent No.: US 9,747,000 B2
(45) Date of Patent: *Aug. 29, 2017

(54) LAUNCHING APPLICATIONS ON AN ELECTRONIC DEVICE

(71) Applicant: Razer (Asia-Pacific) Pte. Ltd., Singapore (SG)

(72) Inventors: Michael A. Chan, San Francisco, CA (US); Justin Quan, San Francisco, CA (US); Brian Chu, San Mateo, CA (US); Aanchal Jain, Brisbane, CA (US)

(73) Assignee: RAZER (ASIA-PACIFIC) PTE. LTD., Singapore (SG)

(*) Notice: Subject to any disclaimer, the term of this patent is extended or adjusted under 35 U.S.C. 154(b) by 0 days.

This patent is subject to a terminal disclaimer.

(21) Appl. No.: 14/840,611

(22) Filed: Aug. 31, 2015

(65) Prior Publication Data

US 2015/0370428 A1 Dec. 24, 2015

Related U.S. Application Data

(63) Continuation-in-part of application No. 14/043,034, filed on Oct. 1, 2013, which is a continuation-in-part
(Continued)

(51) Int. Cl.
*H04L 29/08* (2006.01)
*H04L 29/06* (2006.01)
(Continued)

(52) U.S. Cl.
CPC ........ *G06F 3/0482* (2013.01); *G06F 3/04842* (2013.01); *G06F 8/62* (2013.01);
(Continued)

(58) Field of Classification Search
CPC .............................. G06F 3/04842; G06F 9/445
(Continued)

(56) References Cited

U.S. PATENT DOCUMENTS 6,811,486 B1 11/2004 Luciano, Jr.
7,315,740 B2 1/2008 Maes
(Continued)

FOREIGN PATENT DOCUMENTS

EP 2 680 207 A1 1/2014

OTHER PUBLICATIONS

"Data Synchronization Patterns in Mobile Application Design"—McCormick et al, Vanderbilt University, Aug. 2009 https://pdfs.semanticscholar.org/a163/89fad50623bcd06aa518d88e9fc7871ec17a.pdf.*
(Continued)

*Primary Examiner* — Randy Scott
(74) *Attorney, Agent, or Firm* — Mattingly & Malur, PC

(57) ABSTRACT

In some examples, an electronic device may offload an application to a network storage. For instance, the application, associated application data, and/or saved application state information may be deleted from the electronic device. Subsequently, an application launcher may present a launcher user interface (UI) on a display associated with the electronic device. The launcher UI may include a first set of application representations corresponding to applications offloaded from the electronic device, and a second set of application representations corresponding to applications currently installed on the electronic device. In response to receiving a selection of one of the representations from the first set via the launcher UI, the selected application may be onloaded onto the electronic device. Further, in some cases, the electronic device may receive from the network storage at least one of the application data or the application state information for the onloaded application.

18 Claims, 8 Drawing Sheets

Related U.S. Application Data of application No. 13/772,163, filed on Feb. 20, 2013, now Pat. No. 9,106,721.

(60) Provisional application No. 61/708,794, filed on Oct. 2, 2012.

(51) Int. Cl.

| | | |
|---|---|---|
| *G06F 3/0482* | (2013.01) | |
| *G06F 3/0484* | (2013.01) | |
| *G06F 9/445* | (2006.01) | |
| *H04W 4/00* | (2009.01) | |
| *G06F 17/30* | (2006.01) | |

(52) U.S. Cl.
CPC ........ *G06F 17/30575* (2013.01); *H04L 67/06* (2013.01); *H04L 67/1095* (2013.01); *H04W 4/003* (2013.01); *H04L 67/10* (2013.01)

(58) Field of Classification Search
USPC ........ 715/711, 715, 739, 744; 709/205, 217, 709/229, 231, 234
See application file for complete search history.

(56) References Cited

U.S. PATENT DOCUMENTS

| | | | |
|---|---|---|---|
| 7,326,117 B1 | 2/2008 | Best | |
| 7,490,045 B1 | 2/2009 | Flores et al. | |
| D611,494 S | 3/2010 | Akiyoshi et al. | |
| 7,774,457 B1 | 8/2010 | Talwar et al. | |
| 7,903,383 B2 | 3/2011 | Fukano et al. | |
| 8,005,956 B2 | 8/2011 | Williams et al. | |
| D646,695 S | 10/2011 | Hoggarth et al. | |
| 8,234,348 B1 | 7/2012 | Tulchinsky et al. | |
| 8,290,920 B2 | 10/2012 | Mahajan et al. | |
| 8,315,977 B2 | 11/2012 | Anand et al. | |
| 8,423,511 B1 | 4/2013 | Bhatia | |
| D682,874 S | 5/2013 | Frijlink et al. | |
| 8,438,298 B2 | 5/2013 | Arai et al. | |
| D683,737 S | 6/2013 | Brinda et al. | |
| 8,473,577 B2 | 6/2013 | Chan | |
| 8,475,275 B2 | 7/2013 | Weston et al. | |
| 8,478,816 B2 | 7/2013 | Parks et al. | |
| 8,494,576 B1 | 7/2013 | Bye et al. | |
| 8,495,129 B2 | 7/2013 | Wolman et al. | |
| 8,515,902 B2 | 8/2013 | Savage | |
| D689,505 S | 9/2013 | Convay et al. | |
| 8,539,567 B1 | 9/2013 | Logue et al. | |
| 8,577,292 B2 | 11/2013 | Huibers | |
| 8,589,140 B1 | 11/2013 | Poulin | |
| 8,606,948 B2 | 12/2013 | Evans et al. | |
| 8,666,938 B1 | 3/2014 | Pancholy | |
| 8,747,232 B1 | 6/2014 | Quan et al. | |
| 8,764,555 B2 | 7/2014 | Quan et al. | |
| 8,775,449 B2 | 7/2014 | Quan et al. | |
| D710,878 S | 8/2014 | Jung | |
| 8,812,601 B2 | 8/2014 | Hsieh et al. | |
| 8,840,461 B2 | 9/2014 | Quan et al. | |
| 8,868,859 B2 | 10/2014 | Schmidt et al. | |
| D718,334 S | 11/2014 | Cranfill | |
| 8,892,693 B2 | 11/2014 | Quan et al. | |
| 8,913,056 B2 | 12/2014 | Zimmer et al. | |
| 8,951,127 B2 | 2/2015 | Quan et al. | |
| 8,954,611 B2 | 2/2015 | Chan et al. | |
| 8,977,723 B2 | 3/2015 | Quan et al. | |
| D726,753 S | 4/2015 | Angelides | |
| D730,383 S | 5/2015 | Brinda et al. | |
| D731,537 S | 6/2015 | Jeong et al. | |
| D732,549 S | 6/2015 | Kim | |
| D734,775 S | 7/2015 | Nagasawa et al. | |
| D736,822 S | 8/2015 | Tursi et al. | |
| 9,095,779 B2 | 8/2015 | Chan et al. | |
| 9,112,885 B2 | 8/2015 | Chan et al. | |
| D737,852 S | 9/2015 | De La Rosa et al. | |
| 9,210,203 B2 | 12/2015 | Quan et al. | |
| 9,268,655 B2 | 2/2016 | Chan et al. | |
| 9,274,780 B1 * | 3/2016 | Velummylum | ........... G06F 8/65 |
| 9,374,407 B2 | 6/2016 | Quan et al. | |
| 9,380,093 B2 | 6/2016 | Quan et al. | |
| 2001/0039212 A1 | 11/2001 | Sawano et al. | |
| 2002/0161908 A1 | 10/2002 | Benitez et al. | |
| 2003/0069037 A1 | 4/2003 | Kiyomoto et al. | |
| 2003/0078959 A1 | 4/2003 | Yeung et al. | |
| 2004/0018876 A1 | 1/2004 | Kubota et al. | |
| 2004/0121837 A1 | 6/2004 | Chiang et al. | |
| 2004/0203381 A1 | 10/2004 | Cahn et al. | |
| 2005/0147130 A1 | 7/2005 | Hurwitz et al. | |
| 2006/0030408 A1 | 2/2006 | Kiiskinen | |
| 2006/0073788 A1 | 4/2006 | Halkka et al. | |
| 2007/0130217 A1 | 6/2007 | Linyard et al. | |
| 2008/0055311 A1 | 3/2008 | Aleksic et al. | |
| 2008/0201705 A1 | 8/2008 | Wookey | |
| 2008/0220878 A1 | 9/2008 | Michaelis | |
| 2009/0063690 A1 | 3/2009 | Verthein et al. | |
| 2009/0077263 A1 | 3/2009 | Koganti et al. | |
| 2009/0106110 A1 | 4/2009 | Stannard et al. | |
| 2009/0204966 A1 | 8/2009 | Johnson et al. | |
| 2009/0282125 A1 | 11/2009 | Jeide et al. | |
| 2010/0173712 A1 | 7/2010 | Buhr | |
| 2010/0235511 A1 | 9/2010 | Kai | |
| 2010/0257403 A1 | 10/2010 | Virk et al. | |
| 2010/0332401 A1 | 12/2010 | Prahlad et al. | |
| 2011/0076941 A1 | 3/2011 | Taveau et al. | |
| 2011/0078319 A1 | 3/2011 | Ishida | |
| 2011/0093567 A1 | 4/2011 | Jeon et al. | |
| 2011/0106755 A1 | 5/2011 | Hao et al. | |
| 2011/0126168 A1 | 5/2011 | Ilyayev | |
| 2011/0219105 A1 | 9/2011 | Kryze et al. | |
| 2011/0252071 A1 | 10/2011 | Cidon | |
| 2011/0275316 A1 | 11/2011 | Suumäki et al. | |
| 2011/0286026 A1 | 11/2011 | Matsuzawa | |
| 2011/0313922 A1 | 12/2011 | Ben Ayed | |
| 2012/0017236 A1 | 1/2012 | Stafford et al. | |
| 2012/0023250 A1 | 1/2012 | Chen et al. | |
| 2012/0028714 A1 | 2/2012 | Gagner et al. | |
| 2012/0036218 A1 | 2/2012 | Oh et al. | |
| 2012/0036239 A1 | 2/2012 | Donaghey et al. | |
| 2012/0064908 A1 | 3/2012 | Fox et al. | |
| 2012/0069131 A1 | 3/2012 | Abelow | |
| 2012/0079095 A1 | 3/2012 | Evans et al. | |
| 2012/0084803 A1 | 4/2012 | Johansson et al. | |
| 2012/0110568 A1 | 5/2012 | Abel et al. | |
| 2012/0128172 A1 | 5/2012 | Alden | |
| 2012/0149309 A1 | 6/2012 | Hubner et al. | |
| 2012/0166518 A1 * | 6/2012 | Alev | ....................... H04L 67/02 709/203 |
| 2012/0171951 A1 | 7/2012 | 't Hooft | |
| 2012/0203932 A1 | 8/2012 | da Costa et al. | |
| 2012/0210343 A1 | 8/2012 | McCoy et al. | |
| 2012/0278439 A1 * | 11/2012 | Ahiska | ..................... A63F 13/12 709/218 |
| 2012/0290717 A1 | 11/2012 | Luna | |
| 2012/0303778 A1 | 11/2012 | Ahiska et al. | |
| 2013/0007203 A1 | 1/2013 | Szu | |
| 2013/0044106 A1 | 2/2013 | Shuster et al. | |
| 2013/0045795 A1 | 2/2013 | Fiedler | |
| 2013/0080964 A1 * | 3/2013 | Shigeta | ................. G06F 3/0488 715/773 |
| 2013/0086114 A1 | 4/2013 | Wilson et al. | |
| 2013/0117806 A1 | 5/2013 | Parthasarathy et al. | |
| 2013/0159890 A1 | 6/2013 | Rossi | |
| 2013/0219381 A1 | 8/2013 | Lovitt | |
| 2013/0223240 A1 | 8/2013 | Hayes et al. | |
| 2013/0225087 A1 | 8/2013 | Uhm | |
| 2013/0304898 A1 | 11/2013 | Aggarwal et al. | |
| 2013/0339058 A1 | 12/2013 | Gotlib et al. | |
| 2014/0040239 A1 | 2/2014 | Hirsch | |
| 2014/0053054 A1 | 2/2014 | Shen et al. | |
| 2014/0095734 A1 | 4/2014 | Chan et al. | |
| 2014/0101300 A1 | 4/2014 | Rosensweig et al. | |
| 2014/0136481 A1 | 5/2014 | Quan et al. | |
| 2014/0170978 A1 | 6/2014 | Wolman et al. | |
| 2014/0215030 A1 | 7/2014 | Terwilliger et al. | |

(56) References Cited

U.S. PATENT DOCUMENTS

| | | | |
|---|---|---|---|
| 2014/0221093 | A1 | 8/2014 | Quan et al. |
| 2014/0245203 | A1 | 8/2014 | Lee et al. |
| 2014/0289201 | A1 | 9/2014 | Chan et al. |
| 2014/0289331 | A1 | 9/2014 | Chan et al. |
| 2014/0379853 | A1 | 12/2014 | Shelton |
| 2015/0032889 | A1 | 1/2015 | Chan et al. |
| 2015/0286388 | A1 | 10/2015 | Jeon et al. |
| 2015/0326655 | A1 | 11/2015 | Quan et al. |
| 2015/0365463 | A1 | 12/2015 | Quan et al. |
| 2015/0365817 | A1 | 12/2015 | Chu et al. |
| 2015/0367238 | A1 | 12/2015 | Perrin et al. |
| 2015/0373107 | A1 | 12/2015 | Chan et al. |

OTHER PUBLICATIONS

Notice of Allowance mailed Nov. 4, 2015, for U.S. Appl. No. 14/158,733, of Quan, J., et al., filed Jan. 17, 2014.
Ex Parte Quayle Action mailed Dec. 3, 2015, for U.S. Appl. No. 29/486,424, of Chan, M. A., et al., filed Mar. 28, 2014.
Notice of Allowance mailed Jan. 11, 2016, for U.S. Appl. No. 14/042,398, of Chan, M.A., et al., filed Sep. 30, 2013.
Notice of Allowance mailed Feb. 12, 2016, for U.S. Appl. No. 13/865,515, of Quan, J., et al., filed Apr. 18, 2013.
Notice of Allowance mailed Feb. 12, 2016, for U.S. Appl. No. 14/228,190, of Quan, J., et al., filed Mar. 27, 2014.
Final Office Action mailed Feb. 26, 2016, for U.S. Appl. No. 14/042,509, of Chan, M.A., et al., filed Sep. 30, 2013.
Final Office Action mailed Feb. 29, 2016, for U.S. Appl. No. 14/043,034, of Quan, J., et al., filed Oct. 1, 2013.
Non-Final Office Action mailed Jun. 8, 2016, for U.S. Appl. No. 14/840,636, of Chan, M.A., et al., filed Aug. 31, 2015.
Final Office Action mailed Jun. 17, 2016, for U.S. Appl. No. 14/042,567, of Chan, M.A., et al., filed Sep. 30, 2013.
Notice of Allowance mailed Aug. 3, 2016, for U.S. Appl. No. 29/486,424, of Chan, M.A., et al., filed Mar. 28, 2014.
Non-Final Office Action mailed Aug. 12, 2016, for U.S. Appl. No. 14/221,174, of Chan, M.A., et al., filed Mar. 20, 2014.
Non-Final Office Action mailed Sep. 12, 2016, for U.S. Appl. No. 14/042,509, of Chan, M.A., et al., filed Sep. 30, 2013.
Non Final Office Action mailed Sep. 19, 2016, for U.S. Appl. No. 14/043,034, of Quan, J., et al., filed Oct. 1, 2013.
International Search Report and Written Opinion mailed Feb. 3, 2014, 7 pp., for International Application No. PCT/US2013/062729 filed Sep. 30, 2013.
International Search Report and Written Opinion mailed Feb. 3, 2014, 9 pp., for International Application No. PCT/US2013/062986 filed Oct. 2, 2013.
International Search Report and Written Opinion mailed Feb. 3, 2014, 7 pp., for International Application No. PCT/US2013/062737 filed Sep. 30, 2013.
International Search Report and Written Opinion mailed Sep. 11, 2014, 6 pps., for International Application No. PCT/US2014/031488 filed Mar. 21, 2014.
Kevin, "Android Automatic App Updates Part 2," Worldstart's Tech Tips and Computer Help, dated Apr. 10, 2012, Retrieved from the Internet URL: http://www.worldstart.com/android-automatic-app-updates-part-2/, retrieved on Oct. 22, 2015, pp. 1-3.
Khan, S., "ZDBox for Android Is All-In-One Toolkit to Monitor and Manage Device," dated Mar. 4, 2011, Retrieved from the Internet URL: http://www.addictivetips.com/mobile/zdbox-for-android-is-all-in-one-toolkit-to-monitor-and-manage-device/, retrieved on Oct. 27, 2015, pp. 1-6.
Layton, J.B., "User Space File Systems," Linux Magazine, accessed at http://www.linux-mag.com/id/7814, Jun. 22, 2010, pp. 1-4.
McCormick, Z. and Schmidt, D. C., "Data Synchronization Patterns in Mobile Application Design," Vanderbilt University, pp. 1-14 (2012).
Nickinson, P., "Add a signature in gmail," Android Central, dated Nov. 29, 2010, Retrieved from the Internet URL: http://www.androidcentral.com/add-signature-gmail, retrieved on Oct. 26, 2015, pp. 1-10.
Design U.S. Appl. No. 29/486,424 by Chan, M.A., et al., filed Mar. 28, 2014.
Non-Final Office Action mailed Mar. 7, 2014, for U.S. Appl. No. 14/158,715, by Quan, J., et al., filed Jan. 17, 2014.
Non Final Office Action mailed Mar. 10, 2014, for U.S. Appl. No. 14/173,680, by Quan, J., et al., filed Feb. 5, 2014.
Non-Final Office Action mailed Apr. 2, 2014, U.S. Appl. No. 14/179,709 by Quan, J., et al., filed Feb. 13, 2014.
Non-Final Office Action mailed Apr. 3, 2014, U.S. Appl. No. 14/158,682 by Quan, J., et al., filed Jan. 17, 2014.
Notice of Allowance mailed Apr. 15, 2014, for U.S. Appl. No. 14/167,834, by Quan, J., et al., filed Jan. 29, 2014.
Non-Final Office Action mailed May 8, 2014, for U.S. Appl. No. 14/179,744 by Quan, J., et al., filed Feb. 13, 2014.
Non-Final Office Action mailed May 9, 2014, for U.S. Appl. No. 14/160,444 by Quan, J., et al., filed Jan. 21, 2014.
Notice of Allowance mailed May 14, 2014, for U.S. Appl. No. 14/158,715, by Quan, J., et al., filed Jan. 17, 2014.
Notice of Allowance mailed May 20, 2014, for U.S. Appl. No. 14/173,680, by Quan, J., et al., filed Feb. 5, 2014.
Non-Final Office Action mailed May 27, 2014, U.S. Appl. No. 14/158,733 by Quan, J., et al., filed Jan. 17, 2014.
Non-Final Office Action mailed Jun. 9, 2014, for U.S. Appl. No. 14/167,939 by Quan, J., et al., filed Jan. 29, 2014.
Final Office Action mailed Jul. 24, 2014, for U.S. Appl. No. 14/179,709 by Quan, J., et al., filed Feb. 13, 2014.
Notice of Allowance mailed Aug. 12, 2014, for U.S. Appl. No. 14/179,709 by Quan, J., et al., filed Feb. 13, 2014.
Non-Final Office Action mailed Aug. 26, 2014, for U.S. Appl. No. 14/267,823 by Chan, M.A., et al., filed May 1, 2014.
Notice of Allowance mailed Sep. 3, 2014, for U.S. Appl. No. 14/160,444 by Quan, J., et al., filed Jan. 21, 2014.
Non Final Office Action mailed Oct. 23, 2014, for U.S. Appl. No. 14/252,674 by Chan, M.A., et al., filed Apr. 14, 2014.
Notice of Allowance mailed Oct. 29, 2014, for U.S. Appl. No. 14/167,939 by Quan, J., et al., filed Jan. 29, 2014.
Notice of Allowance mailed Oct. 29, 2014, for U.S. Appl. No. 14/179,744 by Quan, J., et al., filed Feb. 13, 2014.
Non Final Office Action mailed Nov. 3, 2014, for U.S. Appl. No. 13/772,163 by Quan, J., filed Feb. 20, 2013.
Final Office Action mailed Nov. 6, 2014, U.S. Appl. No. 14/158,682 by Quan, J., et al., filed Jan. 17, 2014.
Notice of Allowance mailed Nov. 25, 2014, for U.S. Appl. No. 14/252,674 by Chan, M.A., et al., filed Apr. 14, 2014.
Non Final Office Action mailed Dec. 3, 2014, for U.S. Appl. No. 14/251,463 by Quan, J., et al., filed Apr. 11, 2014.
Notice of Allowance mailed Dec. 4, 2014, for U.S. Appl. No. 14/479,140 by Chan, M.A., et al., filed Sep. 5, 2014.
Notice of Allowance mailed Dec. 12, 2014, for U.S. Appl. No. 14/479,140 by Chan, M.A., et al., filed Sep. 5, 2014.
Notice of Allowance mailed Dec. 17, 2014, for U.S. Appl. No. 14/267,823 by Chan, M.A., et al., filed May 1, 2014.
Notice of Allowance mailed Dec. 19, 2014, for U.S. Appl. No. 14/479,140 by Chan, M.A., et al., filed Sep. 5, 2014.
Notice of Allowance mailed Dec. 22, 2014, for U.S. Appl. No. 14/179,744 by Quan, J., et al., filed Feb. 13, 2014.
Final Office Action mailed Dec. 23, 2014, for U.S. Appl. No. 14/158,733 by Quan, J., et al., filed Jan. 17, 2014.
Notice of Allowance mailed Mar. 17, 2015, for U.S. Appl. No. 14/158,733, Quan, J., et al., filed Jan. 17, 2014.
Notice of Allowance mailed Mar. 30, 2015, for U.S. Appl. No. 13/772,163, Quan, J., filed Feb. 20, 2013.
Notice of Allowance mailed on Mar. 30, 2015, for U.S. Appl. No. 14/267,823, Chan, M.A., et al., filed May 1, 2014.
Non-Final Office Action mailed Apr. 8, 2015, for U.S. Appl. No. 13/865,515, Quan, J., et al., filed Apr. 18, 2013.
Non-Final Office Action mailed Apr. 8, 2015, for U.S. Appl. No. 14/228,190, Quan, J., et al., filed Mar. 27, 2014.

(56) References Cited

OTHER PUBLICATIONS

Notice of Allowance mailed on Apr. 15, 2015, for U.S. Appl. No. 14/479,140, Chan, M.A., et al., filed Sep. 5, 2014.
Non-Final Office Action mailed May 15, 2015, for U.S. Appl. No. 14/042,398, by Chan, M.A., et al., filed Sep. 30, 2013.
Non-Final Office Action mailed Jun. 22, 2015, for U.S. Appl. No. 14/043,034, of Quan, J., et al., filed Oct. 1, 2013.
Non-Final Office Action mailed Jun. 22, 2015, for U.S. Appl. No. 14/158,682, of Quan, J., et al., filed Jan. 17, 2014.
Non-Final Office Action mailed Jul. 20, 2015, for U.S. Appl. No. 14/042,509, of Chan, M.A., et al., filed Sep. 30, 2013.
Notice of Allowance mailed Jul. 24, 2015, for U.S. Appl. No. 14/158,733, of Quan, J., et al., filed Jan. 17, 2014.
Non-Final Office Action mailed Aug. 21, 2015, for U.S. Appl. No. 14/042,567, of Chan, M.A., et al., filed Sep. 30, 2013.
Notice of Allowance mailed Sep. 2, 2015, for U.S. Appl. No. 14/042,398, of Chan, M.A., et al., filed Sep. 30, 2013.
Final Office Action mailed Sep. 9, 2015, for U.S. Appl. No. 14/251,463, of Quan, J., et al., filed Apr. 11, 2014.
Notice of Allowance mailed Oct. 2, 2015, for U.S. Appl. No. 14/228,190, of Quan, J., et al., filed Mar. 27, 2014.
Notice of Allowance mailed Oct. 7, 2015, for U.S. Appl. No. 13/865,515, of Quan, J., et al., filed Apr. 18, 2013.

\* cited by examiner

LAUNCHING APPLICATIONS ON AN ELECTRONIC DEVICE

CROSS-REFERENCES TO RELATED APPLICATIONS

This application is a continuation-in-part of U.S. patent application Ser. No. 14/043,034, entitled "APPLICATION STATE BACKUP AND RESTORATION ACROSS MULTIPLE DEVICES", which was filed on Oct. 1, 2013, which is a continuation-in-part of U.S. patent application Ser. No. 13/772,163, entitled "APPLICATION STATE SYNCHRONIZATION ACROSS MULTIPLE DEVICES", filed on Feb. 20, 2013, which claims the benefit of U.S. Provisional Patent Application No. 61/708,794, entitled "CLOUD COMPUTING INTEGRATED OPERATING SYSTEM", which was filed on Oct. 2, 2012, all of which applications are incorporated by reference herein.

BACKGROUND

People use electronic devices for communication, socializing, entertainment, work, navigation, web browsing, and a variety of other functions. However, electronic devices typically have limited storage space, thus restricting the amount of data that a user may maintain on a particular electronic device. For example, people often keep various different types of digital content items on their electronic devices, such as photographs, videos, music, and so forth, and like to have sufficient free storage space to allow addition of more content items when desired without having to first delete existing content items. Furthermore, people may often have many applications installed on their electronic devices. Some of these applications and the associated application data may take up a considerable amount of storage space, while being used relatively infrequently.

SUMMARY

Some implementations herein include techniques and arrangements for managing applications available to a user on an electronic device. For instance, an electronic device may offload an application file and/or associated application data and/or application state information to a network storage to free up storage space on the electronic device. Thus, in some examples, the application may be uninstalled from the electronic device or otherwise offloaded and deleted from the electronic device. An application launcher may present a launcher user interface (UI) on a display associated with the electronic device. The launcher UI may include a first set of application representations corresponding to applications offloaded from the electronic device, and a second set of application representations corresponding to applications currently installed and executable on the electronic device. In response to receiving, via the launcher UI, a selection of one of the application representations from the first set of application representations, the selected application may be onloaded onto the electronic device, such as by reinstalling the application and/or by transferring an application file from the network storage to the electronic device. Further, in some examples, the electronic device may receive from the network storage at least one of associated application data or application state information for the application being onloaded. In other examples, the application data and/or application state information may have been retained on the electronic device and may be used to restore the application after the application is onloaded onto the electronic device. Thus, the application may be restored to its former state and executed in response to the user selection of the application representation in the launcher UI.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
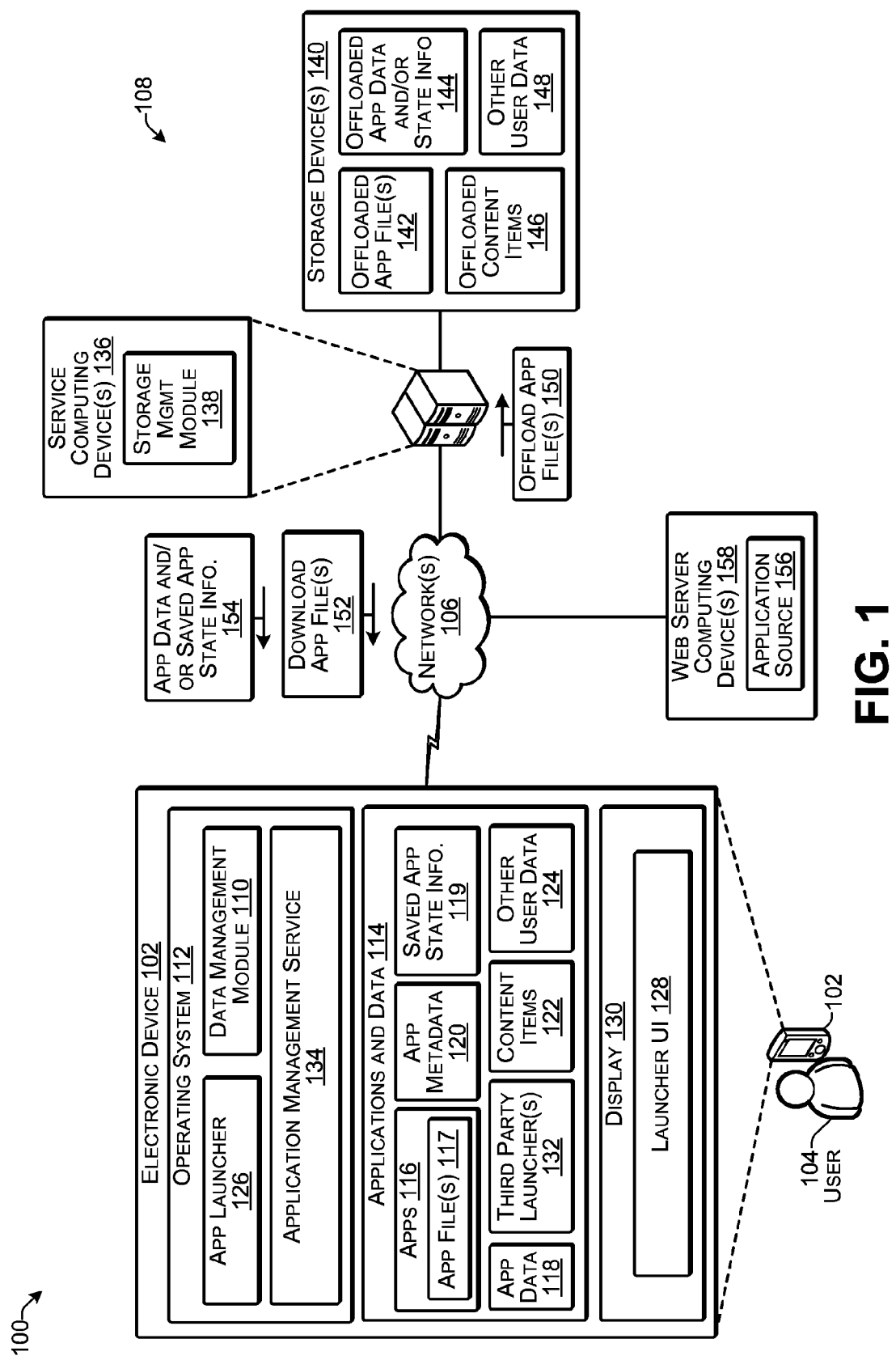
FIG. 1 illustrates an example system for enabling application management on an electronic device according to some implementations.

Some examples herein are directed to management of applications on an electronic device. An application launcher may be included on the electronic device for launching applications on the electronic device. The application launcher may cause an application to launch on the electronic device regardless of whether the application is currently installed on the electronic device or has been offloaded to a network storage to free up storage space on the electronic device. For instance, the electronic device may dynamically manage the amount of available storage on the electronic device by removing user data such as certain applications, application data, and/or content items from the storage of the electronic device, and offloading at least temporarily this user data to a network storage location. In some cases, the launcher may provide a visual indication as to which applications have been offloaded and which applications are currently fully installed on the electronic device. Further, if the user attempts to launch an application that has been offloaded, the electronic device may retrieve, reinstall or otherwise onload the application, and launch the application on the electronic device in real time.

User data comprising content items, applications, and application data typically may consume the largest amount of storage on an electronic device. The electronic device herein may offload a portion of the user data when heuristics indicate that particular applications and/or content items are likely to not be used by the user in the near term. For instance, a data management module may determine which applications or content items a user is likely to use at what times and on what days, and may offload or onload certain user data based on predicted usage patterns. The offloading and onloading of the user data may typically take place in the background without any user interaction to provide a seamless user experience. The applications and application data may be offloaded or onloaded based on the techniques described herein. In some examples, the digital content items may be offloaded and/or onloaded based on the techniques described in U.S. patent application Ser. No. 14/835,993, entitled "MANAGING CONTENT ON AN ELECTRONIC DEVICE", filed Aug. 26, 2015, which is incorporated by reference herein.

In some examples, the data management module may incorrectly anticipate which applications the user will use. For instance, a user may select or otherwise attempt to use an application that is currently offloaded from the electronic device, e.g., the application has been uninstalled and/or an application file for the application has been sent from the electronic device to the network storage. In such a situation, when using the application launcher herein, the user is still able to select the application for execution despite the application not being currently installed on the electronic device or otherwise being offloaded from the electronic device. The application launcher may include a user interface (UI), such as a graphic UI, which the user may use to locate and launch a particular application. In some cases, the launcher may use one or more APIs to communicate with a backend framework including the data management module that manages the onloading and/or offloading of the user data.

In some examples, the user may use the application launcher UI to attempt to launch an application that has been offloaded from the electronic device to the network storage. For instance, icons or other representations of applications that have been offloaded from the electronic device may be presented in the launcher UI along with representations of applications currently fully installed on the electronic device. In some cases, the representations of applications that have been offloaded may be visually distinguished in the launcher from representations of applications that are currently installed on the electronic device. For instance, the representations of applications that have been offloaded may be presented in a graphical style that is distinct from the graphical style used for the representations of applications that are currently fully installed on the electronic device, such as by being grayed out, being presented with broken lines, being presented in a larger or smaller size, being presented in a different shape, being presented along with a graphic element, such as a cloud, or through any of various other graphical distinguishing techniques.

In addition, when the user selects a representation of an application that is currently installed on the electronic device, the data management module may record the time and date on which the user opens the application, how long the user uses the application, whether the application continues to run while the user uses a second application, which applications the user uses before, during, and after the application, and so forth. The data management module may also record similar information when the user selects a representation of an offloaded application that is not currently executable on the electronic device.

Further, in response to the selection of the offloaded application, the launcher may communicate with the data management module to cause the data management module to download and install the selected application as quickly as possible. In response, the data management module may download the application and the associated application data, including previously save state information for the application. Further, the launcher may provide the user with periodically updated status information as the downloading and other onloading of the application progresses. As one example of onloading an application, the installable application file for the application is downloaded from the network storage and, in some examples, the associated application data and/or saved application state information is also downloaded from the network storage. The data management module may reinstall the application and restore the application data and application state for the application. In another example of onloading an application, the application file may be downloaded from the network storage and may be stored to the storage of the electronic device. In this example, the application file may be executed without reinstallation of the downloaded application file. Furthermore, in either case, the data management module may restore the application to its most recent state using previously saved application state information, which may be downloaded contemporaneously with the application file and/or application data, or which may have been retained on the electronic device while the application file was offloaded.

In some examples, the data management module may be an application or other module that is part of the OS. In other examples, the data management module may be an application that is separate from the OS. For instance, the data management module may be an application that the user may be able to see and access via the application launcher, such as for adjusting settings of the data management module. Alternatively, the data management module may be an application separate from the OS that the user cannot see. As still another alternative, the data management module may be implemented as a module of the OS that is not accessible to the user.

In addition, implementations herein may be configured to work with third party launchers that users may install on the electronic device. For example, rather than using a native application launcher that comes with the OS, users may install custom third party launchers having various features preferred by certain users. In some cases, the third party launchers may not be aware that an application has been offloaded, such as in the event that all traces of the application are removed from the electronic device during uninstalling and/or otherwise offloading of the application. This may frustrate a user attempting to use the third party launcher to locate and launch an application that has been offloaded. Accordingly, implementations herein enable the third party launchers to present application representations or other information about offloaded applications in addition to presenting representations of applications that are currently fully installed on the electronic device.

As one example, rather than removing all traces of an application during uninstalling and/or otherwise offloading of the application, the data management module may maintain metadata for each application whether the application is currently installed or offloaded. As one example, when an application is offloaded, a stub including metadata of the application may be left on the electronic device so that the OS launcher and third party launchers on the electronic device are able to determine that an offloaded application exists and is available to be restored onto the electronic device if selected by the user. Further, in some examples, the application data associated with the application and/or saved application state information for the application may also be retained on the electronic device when the application is offloaded. Thus, the data management module might not completely uninstall and remove all traces of an application from the electronic device when offloading an application. Rather, the data management module may leave on the electronic device one or more of application data, saved application state information, or metadata including the application icon or other representation of the application, and may further leave or generate other metadata associated with the application, such as an application file name, application version, application size, size of the associated application data, and so forth. This enables the launcher or a third party launcher to be made aware of the offloaded application, present an icon or other representation of the offloaded application in the launcher UI, and enable selection of the offloaded application by a user, even though the application has been offloaded from the electronic device.

As one example, an application management service, such as a package manager service may typically be accessed by the launcher and/or a third party launcher for retrieving information related to the application packages that are currently installed on the electronic device. Thus, when an application has been offloaded, the data management module may place the application into a limbo state such that rather than enabling opening of the application through the launcher or third party launcher, the application management service may provide the launcher or third party launcher with at least a portion of the metadata for the offloaded application. For example, when the data management module offloads the application, the data management module may generate a grayed-out icon for the application and store this application representation with the application metadata as the representation to be used by the launcher, or at least the third party launcher. Thus, the application management service may provide the grayed-out application representation to the launcher and/or the third party launcher in place of the actual application representation so long as the application is offloaded from the electronic device. For instance, the third party launcher may present the grayed-out icon as the application representation, without being aware that the application has been offloaded from the electronic device.

When, the user selects the grayed-out representation, the launcher or the third party launcher, respectively, sends an instruction to an application management service, such as to an activity manager service provided by the application management service. In some examples, the launcher or the third party launcher may use an application programming interface (API) that configures the instruction in a uniform manner, regardless of the source, to be delivered to the application management service. In response to receiving the instruction, the application management service may then communicate with the data management module to cause the data management module to begin onloading the application, such a by downloading, from the network storage, an application file and the application data associated with the requested application. The data management module may onload the requested application and then may notify the application management service. The application management service may then issue an open call to the application, as if the application had been fully installed onboard the electronic device when the instruction was received from the launcher or the third party launcher. For instance, when a launcher (or other service) is used to launch an application that is currently installed on the electronic device, the launcher may send an open call or similar instruction to the application management service, which opens the selected application.

The launcher is configured to communicate with the data management module, such as via the application management service, to cause the data management module to download and restore an application. The launcher receives communications from the data management module as the application is restored, such as to enable the launcher to inform the user of the status of the application restoration. For instance, the launcher may present a UI informing the user of an estimated time until the download and/or installation of the application is complete. The launcher itself may be able to track which applications are currently installed on the electronic device and which applications have been offloaded from the electronic device. Thus, in some examples, rather than relying on the data management module to generate a visually distinguished representation, the launcher may present representations of the offloaded applications in a different graphical style from the representations of the applications that are currently installed on the electronic device. For instance, the representations of the offloaded applications may be visually distinguished from the representations of the applications that are currently installed using any of the graphics techniques discussed above or any other suitable visual techniques for distinguishing between the two types of applications.

For discussion purposes, some example implementations of an application launcher are described in the environment of offloading and subsequently onloading applications on the electronic device for conserving storage space on the electronic device with minimal disruption to the user experience. However, implementations herein are not limited to the particular examples provided, and may be extended to other types of devices, other execution environments, other system architectures, other application launching techniques, and so forth, as will be apparent to those of skill in the art in light of the disclosure herein.

FIG. 1 illustrates an example system 100 for enabling management of applications according to some implementations. For instance, the system 100 may enable an electronic device 102 associated with a user 104 to communicate over one or more networks 106 with a network storage 108. The electronic device 102 may be any suitable type of computing device, e.g., mobile, semi-mobile, semi-stationary, or stationary. Some examples of the electronic device 102 may include cellular phones, smart phones, tablet computing devices, wearable computing devices, body-mounted computing devices, and other types of mobile devices; laptops, netbooks, and other mobile computers or semi-mobile computers; desktop computing devices, terminal computing devices and other semi-stationary or stationary computing devices; augmented reality devices, gaming systems, or any of various other computing devices capable of storing data, sending communications, and performing the functions according to the techniques described herein. Further, while a single user 104 and associated electronic device 102 are illustrated in this example, in other examples, there may be a large number of users 104, each having one or more respective electronic devices 102.

The electronic device 102 may include a data management module 110 that executes on the electronic device 102. The data management module 110 may be executable code or other executable instructions that provide data management functionality to the electronic device 102 for controlling which applications and/or content items are maintained locally on the electronic device 102 and which are offloaded, at least in part. In some examples, the data management module 110 may be one or more modules of an operating system (OS) 112 on the electronic device 102. In other examples, the data management module 110 may be one or more modules that are separate from the OS 112, such as may be included in one or more applications executable on the electronic device 102. For instance, the data management module 110 may have permission for system-level access to user applications and/or data stored on the electronic device 102. In addition, while the data management module 110 is illustrated in this example as residing on the electronic device 102, in other examples, at least some of the functionality of the data management module 110 may reside on another suitable computing device.

The electronic device 102 may further include applications and data 114, which may include one or more applications (apps) 116 that are installed and maintained on the electronic device 102. Each application 116 may include one or more application files 117, such as at least one application file including components for the executable application. In some examples, the application files 117 may be or may include application files that are installable for execution on the electronic device. Examples of installable application files include an APK file in the case of ANDROID® OS variants, an IPA file in the case of IOS® OS variants, or an XAP file in the case of WINDOWS® Phone OS variants; however, implementations herein are not limited to these examples.

Further, in some examples, the app files 117 may include application asset files that contain media or other content or data provided by the application developer. As one example, an OBB (opaque binary blob) file format is file that may be downloaded for use with an APK file. The OBB file is an expansion file that typically includes additional encrypted format data not stored in the main APK file, including graphics and media files. In some examples herein, the data management module 110 may remove an APK file and an associated OBB file from the electronic device 102 when performing an uninstallation of the application 116, associated application data 118, or saved application state information 119. Further, the data management module 110 may onload the APK file and an associated OBB file, such as by using an API normally used as an updating tool, without performing a reinstallation of the APK file. Thus, implementations herein may be able to offload and onload application files 117 without having to perform uninstall and reinstall operations, which can save considerable time.

The applications and data 114 may further include the application data 118, which may be user application data that is associated with, generated by, and/or used by respective applications of the applications 116. For instance, each application 116 may have an associated portion of application data 118, respectively. In addition, the applications and data 114 may include saved application state information 119. For example, the data management module 110 may be configured to store the state of each application 116 each time the application 116 is accessed on the electronic device 102. Thus, for each application 116 that is used on the electronic device 102, the data management module 110 may take a snapshot of the application 116 when the user stops using the application 116 to obtain the most up-to-date state information. The saved application state information 119 may be saved incrementally as changes are made during use of the respective application 116. The data management module 110 may store this saved application state information 116 temporarily on the electronic device 102 and may subsequently backup the saved application state information 116 to the network storage 108 with other application data 118 information sent to the network storage 108. For instance, the app data 118 and saved application state information 119 may be backed up to the network storage 108 on a daily basis, such as overnight when the electronic device 102 might otherwise be in a standby mode. Further, in other examples, the app data 118 and saved application state information 119 may be retained on the electronic device 102 when the corresponding application 116 is offloaded from the electronic device 102.

In some examples, the applications and data 114 may further include application metadata 120, which may include metadata for local applications 116 currently installed and executable on the electronic device 102 as well as metadata for offloaded applications that are not currently executable unless onloaded, as discussed additionally below. In addition, the applications and data 114 may include one or more content items 122. Examples of content items 122 may include digital photographs, images, videos, audio recordings, documents, books, movies, television shows, and the like. As mentioned above, the data management module 110 may manage the offloading and onloading of content items in addition to offloading and onloading applications and application data. The applications and data 114 may further include other types of user data 124 such as user profiles, user settings, user account information, user data used by the OS 112, and/or data used by other programs on the electronic device 102.

The OS 112 may further include an application launcher 126, which may be an OS application or other OS module that may present a launcher UI 128 to the user 104 on a display 130 associated with the electronic device 102. For example, as discussed below with respect to FIG. 2, the launcher UI 128 may enable the user 104 to search through the applications available to be opened on the electronic device 102. The launcher 126 may present information about applications 116 that are currently installed and executable on the electronic device, and also may present information about the applications that have been offloaded from the electronic device 102 to the network storage 108. Thus, the user 104 may use the launcher UI 128 to select an installed application 116 or an offloaded application for launching execution of the application on the electronic device 102. Additionally, in other examples, the application launcher 126 may be a native application that is separate from the OS 112, but configured for use with the OS 112 and the data management module 110, as discussed additionally below.

Furthermore, in some examples, the applications and data 114 may include one or more third party launchers 132. For example, an application launcher may serve the function of a start screen and/or home screen to organize a user's applications and data and to help the user to locate and start applications. In some examples, third party launchers may provide different application organization techniques, search features, or other customizable features that certain users may prefer over the native application launcher 126. Accordingly, implementations herein are configured to accommodate the use of third party launchers 132 in addition to the native OS application launcher 126. In some cases, the third party launcher 132 may be an application 116 downloaded by the user 104, but is shown and referenced separately from the other applications 116 in this example for discussion purposes.

The display 130 may be used for presenting various types of visual information to the user 104, such as the launcher UI 128 provided by the launcher 126 or the third party launcher 132, as well as other UIs, content items, text, images, or other digital information. In addition, the OS 112 may include an application management service 134, which may include one or more OS services for identifying and launching applications on the electronic device 102. Further, while several components and data of the electronic device 102 are described and illustrated in this example, numerous other components and data may be included in the electronic device 102, as discussed additionally below and/or as will be apparent to those of skill in the art having the benefit of the disclosure herein.

In the illustrated example, the network storage 108 includes one or more service computing devices 136 that include a storage management module 138. Further, the service computing device 136 may include, or may be in communication with, one or more storage devices 140, such as by direct connection or via the one or more networks 106. In some examples, the network storage 108 may be provided by a service provider. For instance, various service providers may provide commercial cloud storage or other network storage to the public, typically for a monthly or yearly fee based at least in part on the amount of storage space consumed by an individual user. However, implementations herein are not limited to commercial network storage services, and may be extended to other types of network-accessible storage and storage services. As several alternative examples, the network storage 108 may be a network-attached storage (NAS), a server computing device, a desktop computing device, or the like, such as may be maintained by the user 104 or other entity.

The one or more networks 106 can include any suitable network, including a wide area network, such as the Internet; a local area network, such as an intranet; a wireless network, such as a cellular network; a local wireless network, such as Wi-Fi; short-range wireless communications, such as BLUETOOTH®; a wired network, such as fiber or Ethernet; or any other suitable network, or any combination thereof. Accordingly, the one or more networks 106 may include both wired and/or wireless communication technologies. Components used for such communication technologies can depend at least in part upon the type of network and/or the environment selected. Protocols for communicating over such networks are well known and will not be discussed herein in detail. Accordingly, the electronic device 102 and the service computing device 136 are able to communicate over the one or more networks 106 using wired or wireless connections, and combinations thereof.

The storage management module 138 on the service computing device 136 may manage the storage of offloaded application files 142, offloaded application data and/or saved application state information 144, offloaded content items 146, and backed up other user data 148 of the user 104 stored on the storage devices 140. Further, the storage management module 138 may control access to the offloaded applications, data, and content items. In the case that the network storage 108 is provided by a commercial storage service, the storage devices 140 may be enterprise level storage arrays, such as may be maintained in a storage area network, a NAS cluster, a RAID (redundant array of independent disks) array, a distributed storage node array, or various other types of storage configurations. The storage devices 140 may store offloaded application files 142 that have been offloaded from the electronic device 102, as well as the associated application data and/or saved application state information 144. In addition, the storage devices 140 may store the offloaded content items 146 and the other user data 148, such as backup versions the user's profile, user settings, user account information, and/or various other types of user data. In addition, in some examples, the storage devices 140 may store, with the application data 144, saved application state information for the offloaded application files 142. The data management module 110 may use the saved application state information to restore the applications to their most recent states when onloading the application files 142 back onto the electronic device 102.

In some implementations, the data management module 110 may dynamically manage the amount of available storage on the electronic device 102 by offloading some applications 116 from the electronic device 102. Thus, as indicated at 150, the data management module 110 may create space in the local storage by offloading one or more application files 117 and, in some examples, associated application data 118 and saved application state information 119 from the electronic device 102 for storage at the network storage 108. In some cases, the data management module 110 may automatically offload one or more of the applications 116 to the network storage 108, such as based on one or more user preferences or according to various heuristics such as based on detected patterns of usage. In other cases, prior to moving one or more application files 117 off the electronic device 102, the data management module 110 may present the user 104 with a list of applications to be offloaded and the user 104 may approve, disapprove, or otherwise determine the applications to be offloaded from the electronic device 102. Similarly, based on a prediction that the user will want to use one or more applications, as indicated at 152, the data management module 110 may automatically onload one or more application files 142 and, in some cases, as indicated at 154, associated application data and/or saved application state information.

In some examples, the data management module 110 may identify an application 116 that is not expected to be used for at least some predictable period of time. For instance, the data management module 110 may identify an application that the user has only used on the weekends, e.g., Saturday and Sunday, and not on weekdays such as Monday through Friday. Based at least in part on this determination, on Monday mornings the data management module 110 may offload at least one application file 117 of the application and, in some examples, the associated application data 118 and/or saved application state information 119 to the network storage 108. Subsequently, on Friday evenings, the data management module 110 may download and restore the application file on the electronic device 102.

In some examples, the application data 118 and the saved application state information 119 may remain on the electronic device 102 during the time that the application is offloaded. In other examples, the application data 118 and/or the saved application state information 119 may be offloaded with the application file 117 and then onloaded with the application file during onloading of the application. In some examples, multiple application files 117 may be offloaded for a particular application 116, such as an application file including at least some components of the executable code of the application (e.g., an APK file) and one or more application asset files (e.g., an OBB file). The multiple offloaded files 117 may then be subsequently onloaded back onto the electronic device 102 during onloading.

The data management module 110 may observe application usage by the user 104 to determine usage patterns for the user 104 with the respect to particular onloaded applications 116 and offloaded applications. In addition, the data management module 110 may use the observed usage patterns to determine when to download an offloaded application file 142 back on to the electronic device 102. The offloading and onloading of application files and application data may normally take place in the background without user action. Further, in the case that that user attempts to access a particular application that is not currently maintained on the storage of the electronic device 102, the data management module 110 may be configured to onload the particular application right away. Depending in part on the connection speed to the network storage 108, this may take place in real time following the user selection of the particular application.

The data management module 110 may take into consideration one or more criteria when determining which applications 116 to offload or onload, or to recommend for offloading or onloading. For instance, application size may be generally static, while the size of application data may vary from person to person and application to application. As an example, a photo editing application may be generally the same size on the electronic devices of all users, but the size of the application data associated with the photo editing application may vary dramatically from user to user. Accordingly, the criteria may take into consider the size of both the application files 117 and the associated application data 118 when selecting applications and application data 118 to onload or offload.

In some cases, the data management module 110 may employ one or more observed user data usage patterns, priority rules, expressed user preferences, or other application ranking techniques when determining applications to offload or onload. The data management module 110 may determine which applications 116 are likely to be used by the user 104 in the near future and which applications 116 may be offloaded. As one example, the data management module 110 may rank the applications 116, based at least in part on how recently each application has been used, how often each application is used, how much storage space each application uses, or a combination thereof. For instance, certain applications that are used less frequently and/or that utilize a large amount of storage space may be automatically offloaded to the network storage location or recommended for offloading. Thus, an application may be offloaded based on expiration of a threshold length of time since the last use, based on how infrequently the application has been used over a period of time, based on the application using a threshold amount of storage space, based on the amount of storage space remaining on the electronic device falling below a threshold level, or the like.

As another example, the data management module 110 may select one or more applications for offloading or onloading based on upcoming events or lack thereof. For instance, if a user typically uses certain applications on a flight, during travel, or during similar event categories, the data management module 110 may recommend that those applications 116 and associated application data 118 be offloaded if the user 104 does not have any upcoming travel scheduled. On the other hand, if the user's calendar shows a flight scheduled, the data management module 110 may onload these applications onto the electronic device prior to the flight. In some cases, the offloading and onloading may take place when the electronic device is otherwise not in use, such as when the electronic device 102 is in a standby mode, connected to Wi-Fi, and plugged in to a power source. Some application metadata 120 corresponding to each of the offloaded applications may be maintained at the electronic device 102, such as for maintaining user settings, an application icon, and/or other information about the offloaded application.

The storage management module 138 at the network storage 108 may receive an offloaded application file 142 and the associated application data 144 and may store these in association with a user account associated with the user 104 and/or the electronic device 102. As one example, a copy of the application file 117 and associated application data 118 may be stored at the network storage location in association with a cloud storage account of the user of the electronic device. In some cases, the electronic device 102 may send the application file 117 to the storage management module 138 immediately following installation of the application on the electronic device. For example, the data management module 110 on the electronic device 102 may receive the application file 117 initially from an application source 156, such as an application store or other application provider, e.g., on a web server computing device 158 or the like.

When the application is offloaded at a later point in time, the offloading may not include the actual sending of the application file 117 at the later point in time, since the application file 117 may be already stored at the network storage 108 for each application installed on the electronic device 102. Alternatively, in some examples, when an application is offloaded, the storage management module 138 may obtain a corresponding installable application file for the offloaded application from the application source 156 rather than from the electronic device 102. For example, by obtaining the application file 117 in advance from the electronic device 102 or from a separate source 156, the onloading process can be shortened substantially because the onloading of a first application does not have to wait for the transfer of an application file of a second application being offloaded to be completed.

Subsequently, when the user 104 of the electronic device 102 attempts to execute an offloaded application, the data management module 110 may request download of the corresponding offloaded application file 142. As indicated at 152, the offloaded application file 142 may be sent to the electronic device 102 for onloading. In addition, in some examples, as indicated at 154, the associated application data and/or saved application state information may be sent to the electronic device 102 for restoring the onloaded application on the electronic device 102. After the application has been onloaded onto the electronic device 102, execution of the application on the electronic device 102 may be initiated using the saved application state information 119 so that the application may begin execution in a state at which the user last used the application.

In some examples, during onloading of an offloaded application onto the electronic device 102, the saved application state information 119 for the application being onloaded may sent to the electronic device 102 by the network storage 108. In other examples, the saved application state information 119 may have been retained on the electronic device 102 regardless of whether the application file 117 had been offloaded. The content of the application state information 119 depends at least in part on the particular application that is being executed. Some examples of application state information 119 may include values for various variables used by the applications 116, values for most recent application settings and graphic user interface configurations, values for recently received user inputs or other user selections, and so forth. Thus, the state information 119 for the application may include the stored information to which the application has access at a point in time, essentially creating a snapshot of the application at the point in time.

In some cases, the application state information 119 may be obtained implicitly from the application 116 by causing the application 116 to save its current state. For instance, some applications 116 are configured to save their current states to an application folder or other persistent location when the applications 116 are sent to background processing. For example, application development frameworks for mobile electronic devices may require that application developers cause certain functions to take place in response to certain conditions, such as causing an application to save its state to a persistent memory location when the application is sent to the background. As one example, the use of a "moveTaskToBack" command (or any other suitable OS command that has a similar effect of moving a process to background processing) may cause an application 116 to save its current state information to a persistent memory location, e.g., as saved application state information 119 associated with the particular application 116.

Alternatively, as another example, one or more of the applications 116 may be configured by the application developers to save their respective current states in response to receiving an explicit "save state" command from the data management module 110. For example, an application developer may configure the application 116 to respond to receipt of a save state command by saving the application state information of the application 116 to a specified location. The application state information may then be retrieved from the specified location and backed up to the network storage 108 as the saved application state information 119.

The data management module 110 or another OS module may cause the recently onloaded application 116 on the electronic device 102 to start execution using the corresponding saved application state information 119. For instance, the application 116 may be started using the saved variables, settings, and GUIs that were in place in the application 116 at a point at which execution of the application 116 last left off on the electronic device 102. Accordingly, the selected application 116 is restored to its previous state so that the situation that the application was offloaded from and onloaded onto the electronic device will not affect the user's prior settings, screen configurations, or the like, for the application.

Figure 2:
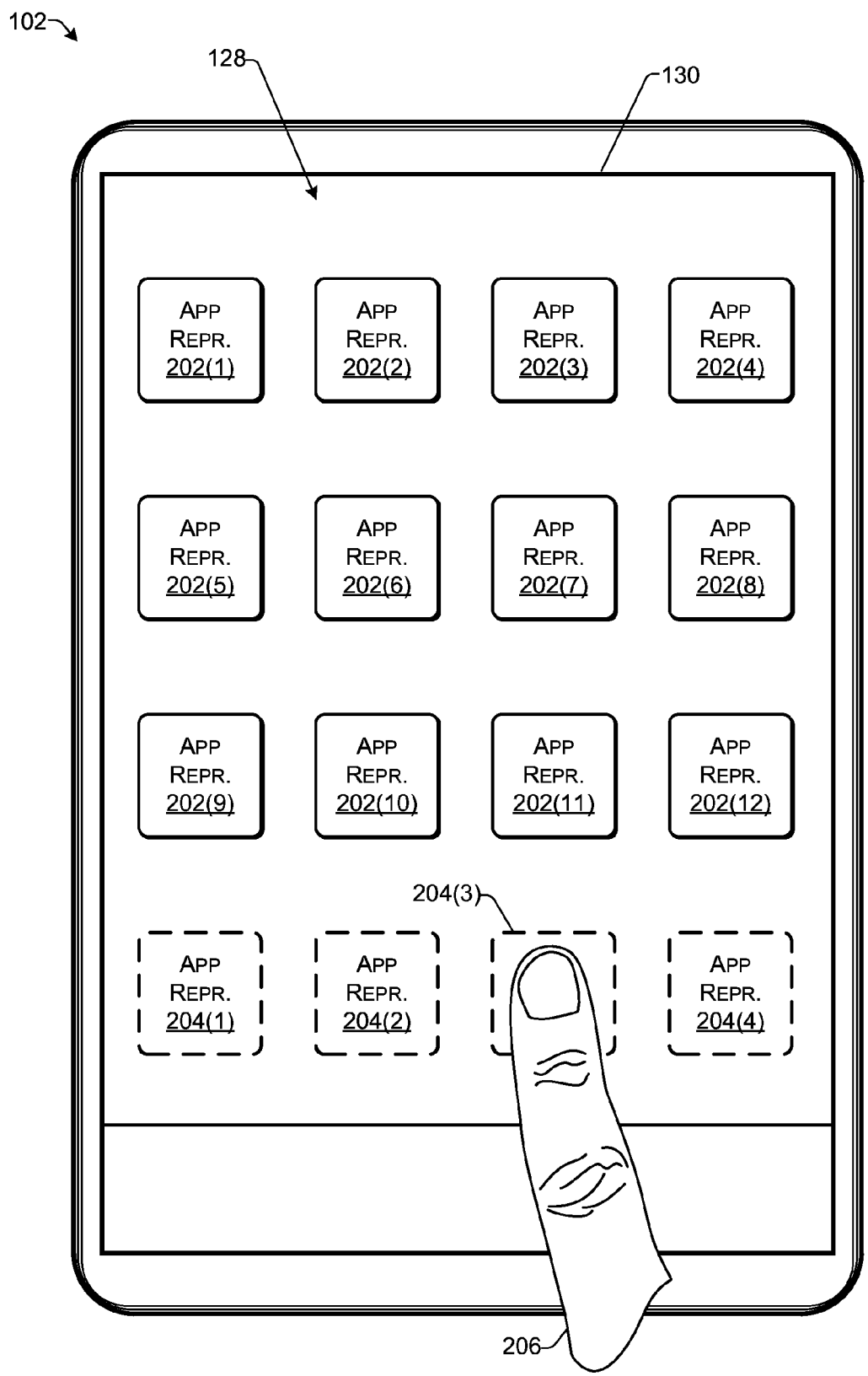
FIG. 2 illustrates an example launcher user interface (UI) for managing applications according to some implementations.

FIG. 2 illustrates an enlarged example view of the electronic device 102 with an example launcher UI 128 presented on the display 130 according to some implementations. The launcher UI 128 may be presented to enable the user 104 to launch, execute, or otherwise select a particular application of a plurality of applications. The launcher UI 128 is an example of a UI that may be presented by either the launcher 126 or the third party launcher 132 according to some implementations. Further, as numerous different configurations are available for launcher UI's, implementations herein are not limited to the example shown in FIG. 2.

In the illustrated example, the launcher UI 128 presents a first plurality of application icons or other representations (repr.) 202 that may represent applications 116 from FIG. 1 that are currently installed on the electronic device 102, such as representations 202(1)-202(12), which may represent twelve respective applications that are installed on the electronic device 102. Furthermore, the launcher UI 128 presents a second plurality of application representations 204 that may represent applications that have been offloaded to the network storage 108. In this example, there are four application representations 204(1)-204(4) that represent four applications for which the corresponding application files 142 have been offloaded to the network storage 108. Further, while a single screen of application representations is shown in this example, the user may be able to scroll left-right and/or up-down to view additional representations 202 and/or 204.

In some cases, following offloading of a particular application to the network storage, the representation 204 representing the offloaded application may remain visible in the launcher UI 128 to enable the user to select the offloaded application for execution should the user so desire. As one example, the application representation 204 may be changed in graphical style to indicate that the application has been offloaded to the network storage, such as by placing a cloud symbol on the representation, graying out the representation, showing the representation with dashed or broken lines, showing the representation as larger or smaller than the representations 202, a different shape, or the like. In the illustrated example, the representations 204(1)-204(4) are presented with dashed lines to indicate to the user that the corresponding applications have been offloaded. If one of the corresponding applications were to be onloaded, e.g., application representation 204(3), then following onloading, that representation would subsequently be presented in the graphical style of the representations 202, i.e., with a solid outline instead of a dashed outline. In other examples, the representations 204 representing the offloaded applications may be moved to a different location in the launcher UI 128, such as to a folder for applications that have been offloaded from the electronic device 102, or to a different page, different directory, or the like. Alternatively, as another example, the application representations 204 might not be graphically distinguished from the application representations 202 so that it is not readily apparent to the user that a particular application has been offloaded to the network storage. As still another alternative, rather than being distinguished by graphical style, or in addition to, the representations 204 may be grouped together separately from the representations 202, such as by being located in separate region of the same page, as illustrated in FIG. 2.

In some implementations, one or more additional UIs (not shown in FIG. 2) may enable the user to interact with the electronic device 102 for additional application management on the electronic device 102. For instance, the user may have an opportunity to select particular applications to be offloaded from the electronic device 102. As one example, a GUI may present a plurality of applications recommended for offloading in a ranked order, such as based on infrequency of use, amount of storage space consumed, or other criteria, as enumerated above. For instance, a least frequently used (or least recently used) application may be listed first, a next least frequently used application may be listed second, and so forth. Further, in some examples, the applications recommended or selected for offloading may consume an amount of storage space in excess of a threshold amount so that it is worth the overhead costs to offload and onload the application.

In other examples, rather than presenting recommended applications for user selection and/or approval, the data management module may proceed with offloading recommended applications according the ranked order. As still another example, the electronic device may automatically and dynamically offload an application when a threshold minimum level of remaining free storage space is reached. For example, suppose that the user is using the electronic device to take photographs or video. Further, suppose that the electronic device 102 determines that that the user is close to running out of storage space on the electronic device 102, e.g., has arrived at a threshold amount of remaining storage capacity. If the electronic device 102 is able to communicate with the network storage, the electronic device 102 may proceed with offloading one or more applications, such as by a background process, based on the ranking criteria discussed above or other suitable criteria.

Further, in some examples, the user may be able specify how long applications are to be retained at the remote storage before being permanently deleted. For example, if the application has been at the network storage for a year (or other specified time) after offloading, and has not been used by the user during that time, the storage management module or the data management module may inform the user that the application will be permanently deleted and/or may proceed with permanently deleting the application and associated application data from the network storage and deleting the corresponding application metadata from the electronic device 102.

In the case that the display 130 is a touchscreen, the user may be able to use a finger 206 to scroll the launcher UI 128 to view other application representations 202 and/or 204. Additionally, the launcher UI 128 may include content item icons, system controls, folders, OS elements, and the like (not shown in FIG. 2). Further, the user may use the finger 206 to tap on or otherwise select a particular application representation 202 or 204 to launch execution of the corresponding application. Thus, in the illustrated example, suppose that the user has selected application representation 204(3), which corresponds to a particular offloaded application. In response, the offloaded application file for the particular offloaded application may be downloaded from the network storage, reinstalled on the electronic device 102, and executed on the electronic device 102 using saved state information to restore the application to its most recent state, as discussed above.

Figure 3:
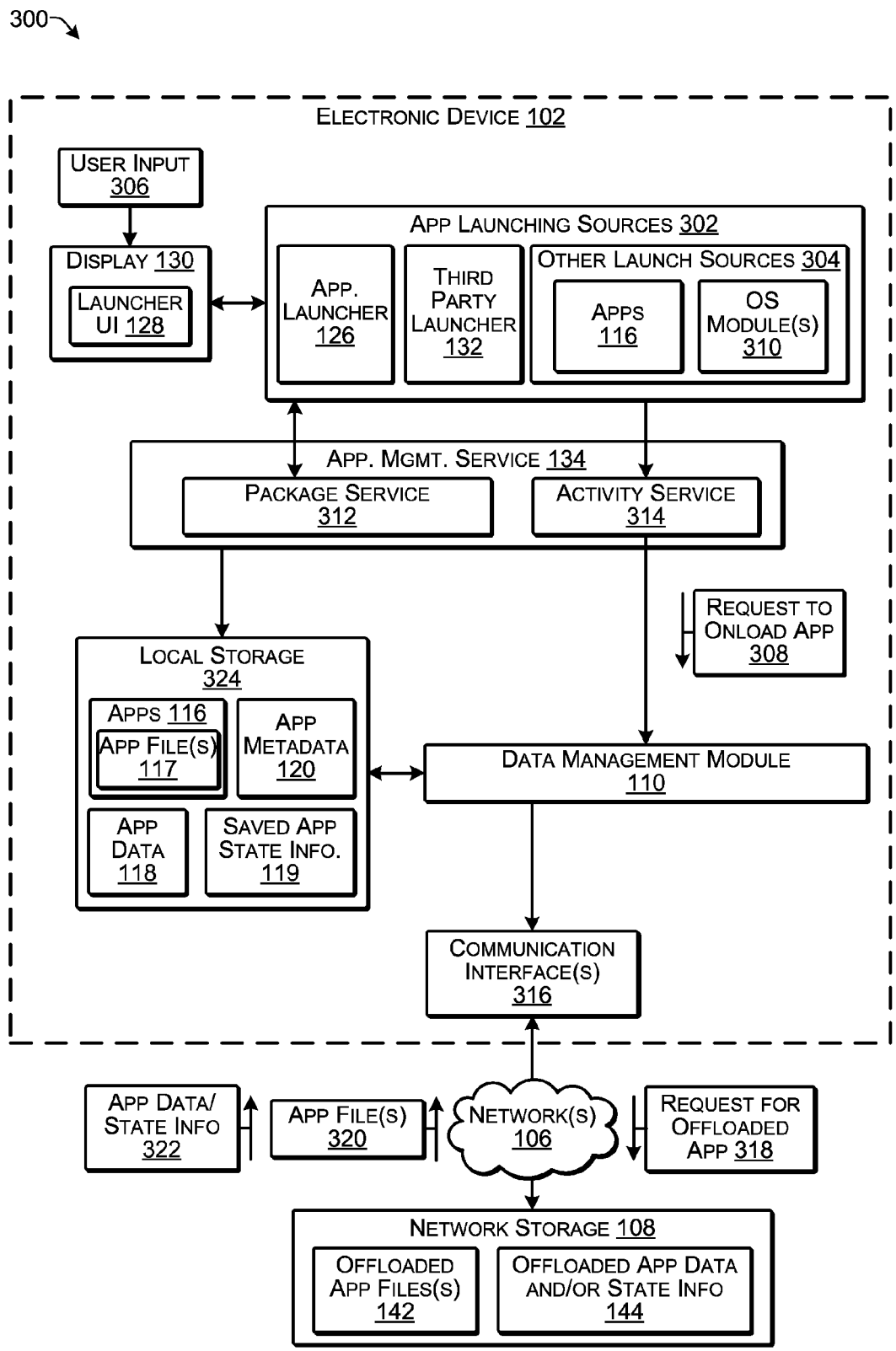
FIG. 3 is a block diagram illustrating interaction of components of an example electronic device according to some implementations.

FIG. 3 is an example block diagram 300 illustrating interaction of components of the electronic device 102 according to some implementations. In this example, a plurality of application launching sources 302 include the application launcher 126, the third party launcher 132, applications 116 and other launch sources 304. For instance, as discussed above, the application launcher 126 and the third party launcher 132 may present a launcher UI 128 on the display 130. The display 130 may be a touchscreen display able to receive a user input 306 to the launcher UI 128. In other examples, other types of input devices may be used to provide the user input 306 via the launcher UI 128.

In addition, other launch sources 304 may include a variety of other techniques and circumstances under which an application may be launched on the electronic device 102. Thus, the other launch sources 304 may also present a launcher UI 128 that enables the user to select an application for execution by making an input via the UI 128. As one example, one or more of the applications 116 may also serve as a launch source 302. For example, a first application 116 may be configured to launch a second application, such as based on user inputs 306, or the like. As one example, the second application may be a map application opened by user input 306 to the first application, such as to show the user a location on a map. If the second application is an offloaded application, then the data management module 110 may receive a request 308 to onload the second application based on the launch initiated via the first application 116.

Additional techniques for launching an application on the electronic device 102 without using a designated launcher application may include a sharing action performed by the user, such as when presented with a "share" button or other virtual control in a UI, such as a UI provided by an application 116 or an OS module 310. For example, the user may be presented with a list of options to use the share button to share an image, such as through email, a social network, a microblog, a pinning site, a photo sharing site, or various other applications. The user may select the share button associated with the image, which may cause a list of applications that may be used to share the image to be presented to the user. Some of the listed applications may have been offloaded, but implementations herein may still include the offloaded applications in the list. For instance, based on the retained application metadata 120 discussed above, the application management service 134 may be used to assemble a list of applications available on the electronic device, which may include the immediately executable applications 116 and the offloaded applications. As one example, the application management service 134 may include a package service 312 that identifies application packages present on the electronic device 102. For example, the package service 312 may be configured to identify applications on the electronic device 102 based on the metadata 120 in addition to other conventional techniques for identifying applications installed on the electronic device 102. Accordingly, the application launching sources 302, including the application launcher 126, the third party launcher 132, and the other launch sources 304 may use the package service 312 for determining available applications even though some of those applications may have been offloaded from the electronic device. As one example, the app launching sources 302 may employ the package service 312 based on an API for determining the applications on the device.

Further, implementations herein are not limited to using the application management service 134 for determining applications that are installed on the electronic device 102 and applications that have been offloaded. For example, the application launcher 126 may be configured to receive this information directly from the data management module 110 or another OS module.

As another example of the other launch sources 304, when selecting a content item, such as a text document, the user may be presented with a list of applications able to open the text document. Thus, similar to the share button example above, some of the applications in the list may be applications that have been offloaded. Further, an example of a less common method for opening an application may be a notification presented by the electronic device, such as by an OS module 310. When the user selects the notification, the selection may cause an application associated with the notification to launch. An example of this may be an email application or microblog application that launches in response to user selection of a notification. Similarly, a settings interface provided by the OS may also cause an application to launch in some situations, such as when the user is adjusting settings that affect a particular application.

Selection by the user of one of the offloaded applications through the application launching sources 302 may cause the application management service 134 to send the request 308 to the data management module 110 to cause the data management module 110 to immediately begin downloading an offloaded application file 142 corresponding to the selected offloaded application. In response to receiving a selection of an application, either one fully installed on the electronic device, or one that has been offloaded, the launcher 126, the third party launcher 132 and/or the other launch sources 304 may communication with an activity service 314, such as based on an API, to cause the selected application to launch or otherwise execute on the electronic device 102. For instance, the launching source 302 sends an instruction to the activity service 314, such as via an API, to cause the activity service to begin execution of the selected application. If the application is already loaded on the electronic device, the activity service 314 may perform in a conventional manner.

On the other hand, if the selected application has been offloaded, the activity service 314 may determine that the selected application is not currently executable on the electronic device 102. Thus, the activity service 314 may send the request 308 to the data management module 110 to cause the data management module 110 to onload the application file and, in some cases, offloaded application data, for the selected application. In some examples, the launchers 126 and 132 and the other launch sources 304 that launch applications may use a public API to communicate with the activity service 314, which interprets the intent of the communication. For instance, if a first application 116 provides a business address, the intent may be interpreted by the activity service 314 as opening a map showing the address on the map. Further, suppose that there are three applications available for opening a map, one of which is currently installed on the electronic device, and two others that have been offloaded. Accordingly, an intent API may be used for determining a particular application to open. Therefore, the activity service 314 may generate an instruction based on the determined intent. If the activity service 314 determines that the intent is to open one of the offloaded applications, the activity service 314 sends the request 308 to the data management module 110, which in turn sends, via one or more communication interfaces 316, a request 318 for the particular offloaded application file 142 and, in some examples, the associated application data and/or saved application state information 144.

In response to receiving the request 318 from the data management module 110, the network storage 108 may send the requested application file 142, as indicated at 320. Further, in some examples, the network storage may send application data and/or saved application state information to the electronic device 102, as indicated at 322. For instance, as mentioned above, the network storage 108 may send at least one of an application file, associated application data, and any saved application state information to the electronic device 102. The data management module 110 may receive the at least one of the application file, the application data, and the application state information via the communication interfaces 316, and may store the received data in a local storage 324.

In some implementations, following receipt of the application file, the data management module 110 may proceed with installing the application. For example, the data management module 110 may install the application, restore the application data, and restore the application to its most recent state based on the saved application state information. The data management module 110 may then send a message to the activity service indicating that the application has been installed. The activity service 314 may then proceed with launching the application in a conventional manner.

In other examples, the application file is not reinstalled. Instead, the application file 117 may be saved to the local storage 324 and associated with the application data 118, the saved application state information 119, and the application metadata 120. As one example, an API that is used for updating application files by replacing an older application file (e.g., an APK file) with a newer application file may be used to onload the application file without executing a reinstallation process.

The application launching sources 302, the activity service 314, and the data management module 110 typically only perform the above operations for onboarding an application out of turn if the data management module 110 has made an incorrect prediction as to which applications 116 should be available on the electronic device 102 during a particular period. Accordingly, in some examples, when the data management module 110 has to onload an application unexpectedly, the data management module 110 may make a record of the launch source, i.e., where the launch instruction came from, and may observe application usage patterns of the user with respect to the onloaded application for adjusting the heuristics used for determining which applications to offload and which applications to onload.

In addition, in some examples, the data management module 110 may determine particular applications that the user may desire to have installed and executable even if the user does not open the particular applications, such as applications that run in the background for performing various functions in certain situations. As one example, a coupon application may run in the background and may generate coupons when the user walks past a particular merchant location. The user does not typically open these types of applications, and in general may not think about opening such an application until the application produces a coupon or other notification to the user. Accordingly, the backend may predict user activity, such as determining that the user is going shopping, and may restore applications appropriate for the predicted user activity.

The data management module 110 may also continually save backups of applications that have been used, e.g., application data and application state information, so that when an application is to be offloaded, there is no time wasted sending the application file, application data, or saved application state information to the network storage 108. Rather, because all the application information may typically already have been backed up to the network storage in the background, there is no need to send any addition application data or files. Thus, when a first application is to be onloaded onto the electronic device 102, a second application that is to be offloaded to make room for the first application may be offloaded by either uninstalling the second application from the electronic device, or by merely deleting the second application file without uninstalling, and it may not be necessary to transfer any application information for the second application to the network storage. Alternatively, in other examples, the second application file may be sent to the network storage as part of the offloading, either with or without uninstallation of the second application, and then the second application file may be deleted from the electronic device 102.

Accordingly, since the user data on the electronic device 102 may be regularly backed up or otherwise synchronized with the user data at the network storage, in some examples, offloading a particular application from the electronic device 102 to the network storage 108 may merely include ensuring the latest version of the application file 117, application data 119, and/or saved application state information 119 has already be synchronized with the network storage 108. As mentioned above, various techniques may be used to select an application to offload in the case that the user requests onloading of an application that is not currently installed on the electronic device 102, such as least recently used, least frequently used, largest application not expected to be used within a threshold period, or so forth.

Figure 4:
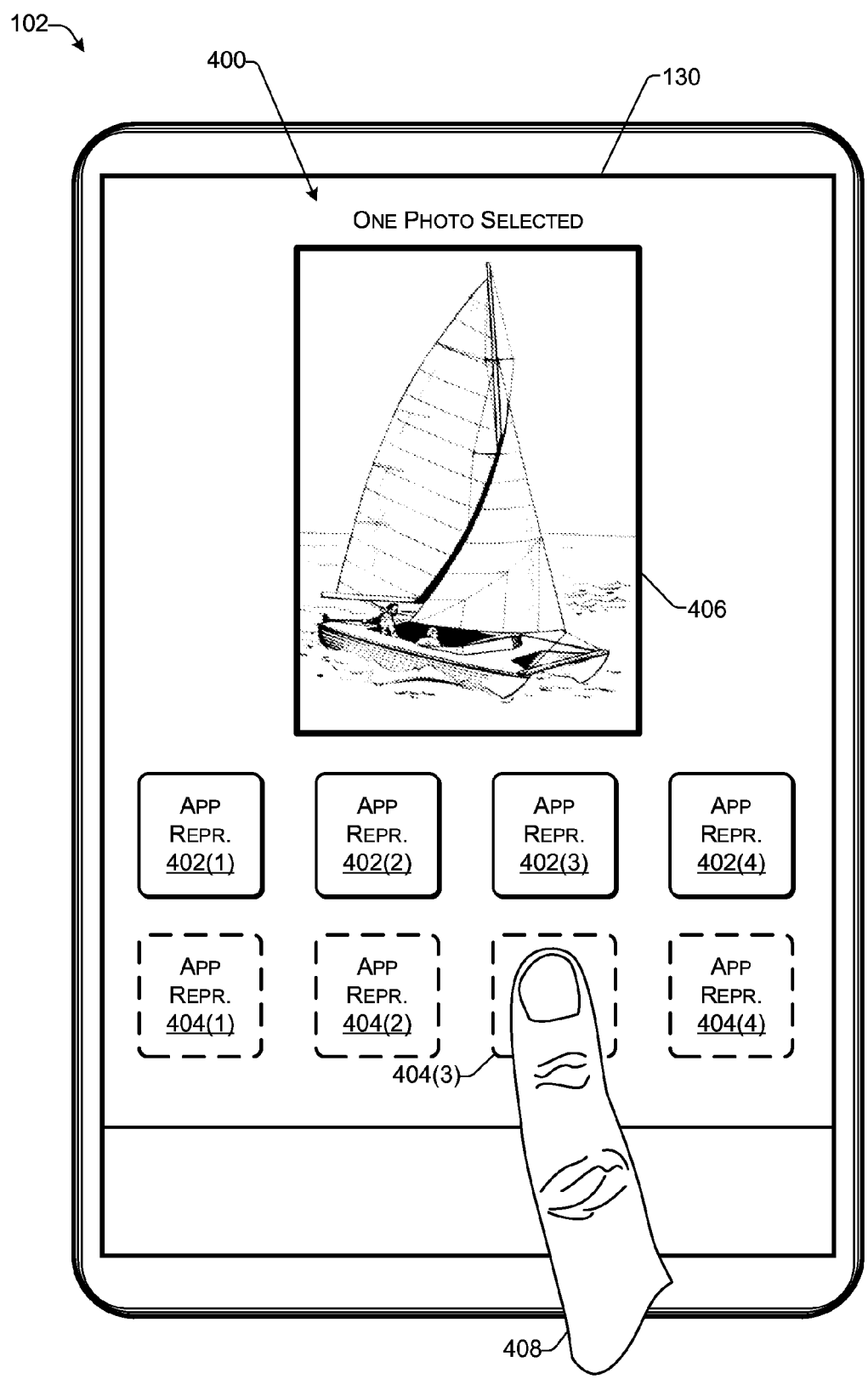
FIG. 4 illustrates an example launcher UI for managing applications according to some implementations.

FIG. 4 illustrates an enlarged example view of the electronic device 102 with an example launcher UI 400 presented on the display 130 according to some implementations. The launcher UI 400 may correspond at least in part to the launcher UI 128 discussed above, and may be presented to enable the user 104 to launch, execute, or otherwise select a particular application of a plurality of applications. The launcher UI 400 is an example of a UI that may be presented by the application launcher 126, the third party application launcher 132, an application 116, or an OS module 310, as discussed above with respect to FIG. 3. Further, as numerous different configurations are available for launcher UI's, implementations herein are not limited to the example shown in FIG. 4.

In the illustrated example, the launcher UI 400 presents a first plurality of application icons or other application representations (repr.) 402 that may represent applications 116 from FIG. 1 that are currently installed on the electronic device 102, such as representations 402(1)-402(4), which may represent four respective applications that are installed on the electronic device 102. Furthermore, the launcher UI 400 presents a second plurality of application representations 404 that may represent applications that have been offloaded to the network storage 108. In this example, there are four application representations 404(1)-404(4) that represent four applications for which the corresponding application files have been offloaded to the network storage 108.

In this example, following offloading of a particular application to the network storage, the representations 404 representing the offloaded applications may remain visible in the launcher UI 400 to enable the user to select the offloaded application for execution should the user so desire. As one example, the application representation 404 may be changed in graphical style to indicate that the application has been moved to the network storage, such as by placing a cloud symbol on the representation, graying out the representation, showing the representation with dashed or broken lines, showing the representation as larger or smaller than the representations 402, a different shape, or the like. In the illustrated example, the representations 404(1)-404(4) are presented with dashed lines to indicate to the user that the corresponding applications have been offloaded. In other examples, the application representations 404 might not be graphically distinguished from the application representations 402 so that it is not readily apparent to the user that a particular application has been offloaded to the network storage.

In the example of FIG. 4, suppose that the user has selected a content item 406, and the selection of the content item causes the launcher UI to present a plurality of application icons 402 and 404 corresponding to applications that may be used to open the selected content item, share the selected content item, and/or perform other functions with respect to the selected content item. In the case that the display 130 is a touchscreen, the user may be able to use a finger 408 to scroll the launcher UI 400 to view other application representations 402 and/or 404. Additionally, the launcher UI 400 may include content item icons, system controls, folders, OS elements, and the like (not shown in FIG. 4). Further, the user may use the finger 408 to tap on or otherwise select a particular application representation 402 or 404 to launch execution of the corresponding application. Thus, in the illustrated example, suppose that the user has selected application representation 404(3), which corresponds to a particular offloaded application. In response, the particular offloaded application may be downloaded from the network storage, reinstalled on the electronic device, and executed on the electronic device 102 using saved state information to restore the application to its most recent state, as discussed above. The restored application may then be used to perform desired function with respect to the content item.

Figure 5:
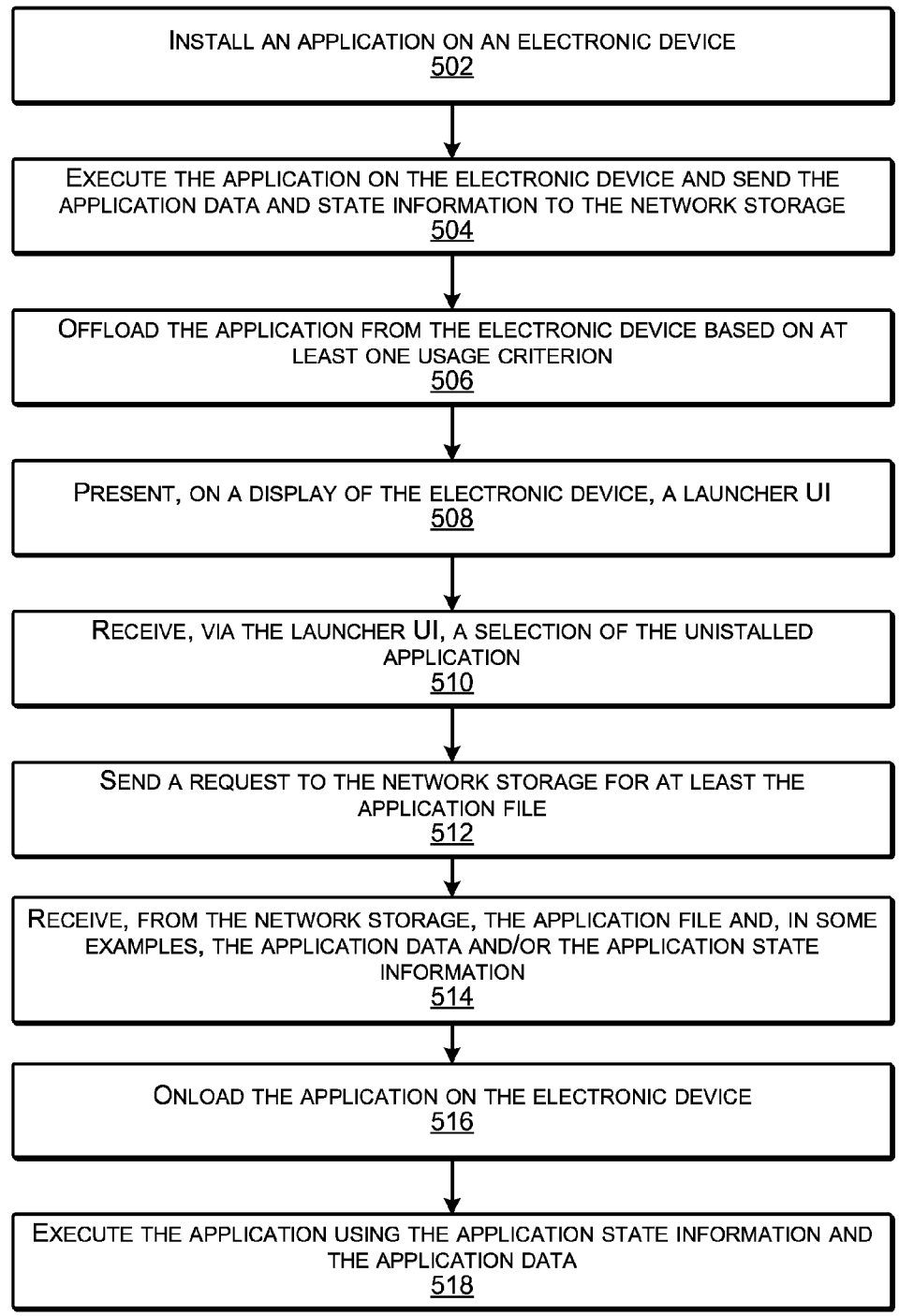
FIG. 5 is a flow diagram illustrating an example process for managing applications on an electronic device according to some implementations.
Figure 6:
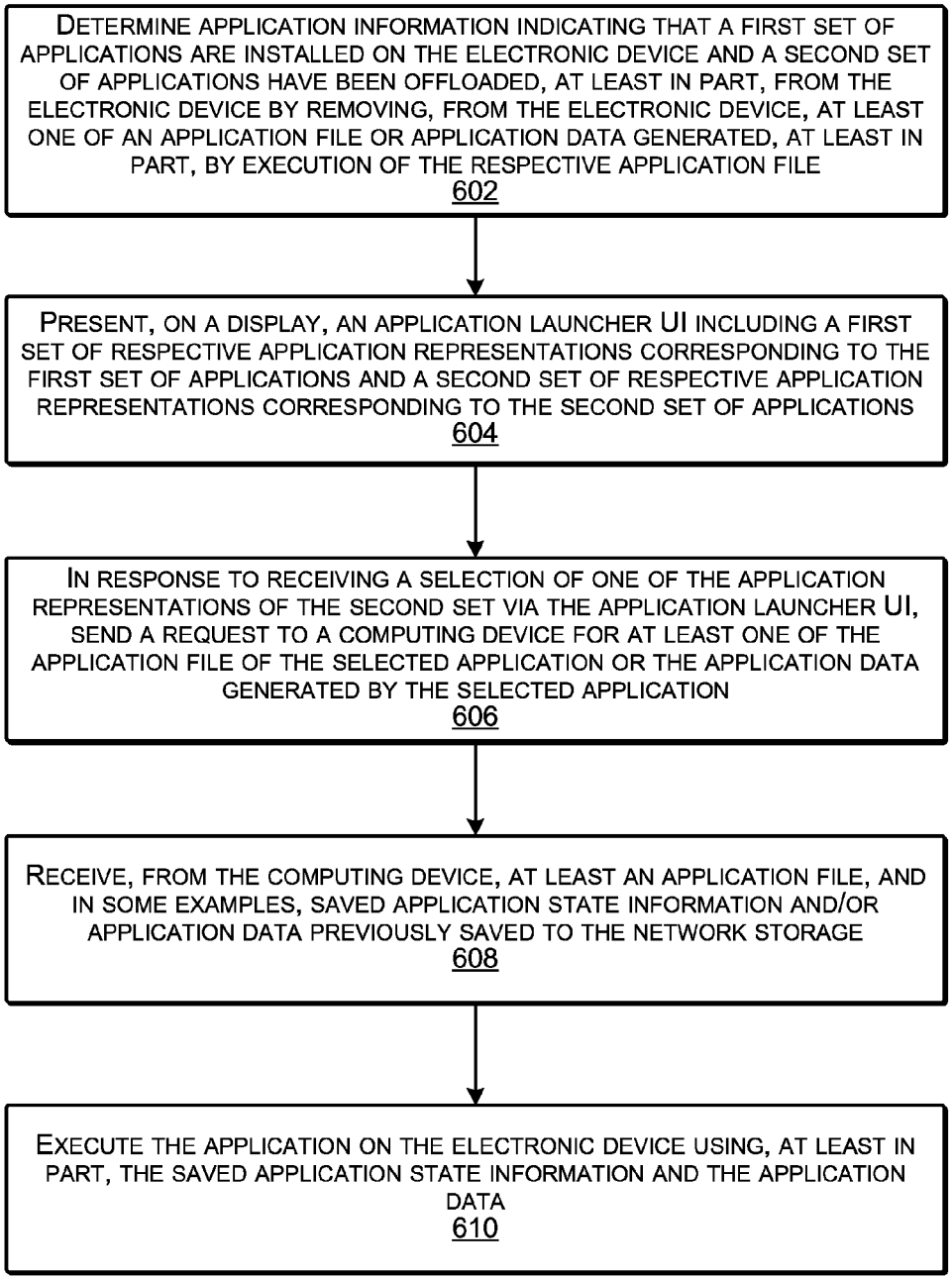
FIG. 6 is a flow diagram illustrating an example process for presenting an application launcher UI on an electronic device according to some implementations.

FIGS. 5-6 are flow diagrams illustrating example processes for managing applications according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

FIG. 5 is a flow diagram illustrating an example process 500 for application management according to some implementations. In some examples, the process may be executed by the electronic device 102 or by another suitable computing device.

At 502, the electronic device may install an application on the electronic device. In some examples, the electronic device may send a copy of the application file used for installation to a network storage before, during, or after installation of the application on the electronic device. For example, the network storage may receive the installable application file from the electronic device or directly from an application store from which the electronic device obtained the application. Alternatively, as discussed below with respect to block 506, the application file may be sent to the network storage when the application is offloaded from the electronic device.

At 504, the electronic device executes the application on the electronic device. Further, the electronic device may send application data and application state information from the execution to the network storage.

At 506, the electronic device may offload the application from the electronic device. For example, the electronic device may determine to offload the application to the network storage based at least in part on at least one of: an amount of time since the application was last accessed on the electronic device; a frequency with which the application was accessed over a period of time; an amount of storage space consumed by the application; or an amount of available storage space remaining on the electronic device. In some examples, offloading of the application may include uninstalling the application from the electronic device. In such a case, the application file for reinstalling the application may have already been saved to the network storage as discussed above at block 502. The associated application data may have already been backed up and saved at the network storage or may be sent to the network storage during offloading of the application. Further, in some examples, saved application state information may also be saved at the network storage. In other examples of offloading the application, rather than uninstalling the application from the electronic device, the application file (e.g., an APK file) may be removed from the electronic device and saved to the network storage without uninstalling the application or application data. Further, if an OBB file or other asset file is associated with the particular application, this application file may also be saved to the network storage and deleted from the electronic device. Further, in some examples, the application data generated by execution of the application and the saved application state information may remain on the electronic device, while one or more application files (e.g., the APK file and the OBB file in the case of an ANDROID® OS) may be offloaded from the electronic device to the network storage without uninstalling the application from the electronic device.

At 508, the electronic device may present, on a display of the electronic device an application launcher UI. The launcher UI may be presented based on execution of a launcher program, or through various other techniques, as discussed above and as discussed with respect to the process of FIG. 6.

At 510, the electronic device may receive, via the launcher UI, a selection of the offloaded application. For example, the launcher UI may present both installed application icons and offloaded application icons. The user may make a user input to select one of the presented icons.

At 512, the electronic device may send a request to the network storage for the application corresponding to the selected icon. For example, the electronic device may request the offloaded application file(s) and the associated offloaded application data and/or saved application state information.

At 514, the electronic device may receive, from the from the network storage, the application file that was saved to the network storage either in connection with installation of the application on the electronic device, as discussed above with respect to block 502, or that was saved during offloading of the application as discussed with respect to block 506. In addition, in some examples, the electronic device may receive the associated application data and/or saved application state information from the network storage. In other examples, however, the associated application data and/or saved application state information may have been retained on the electronic device when the application was offloaded.

At 516, the electronic device may onload the application on the electronic device. As one example, the electronic device may reinstall the application onto the electronic device. As another example, if the application was not uninstalled during offloading, the received application file(s) may be saved to the storage of the electronic device and restored using the saved application state information and associated application data. In some cases, an API associated with the OS may be used for restoring the application to the electronic device without reinstalling of the application.

At 518, the electronic device may execute the application using the saved application state information and the application data received from the network storage. For instance, the electronic device may use the saved application state information when starting the application to cause the application to resume execution at a state at which the application last executed on the electronic device.

FIG. 6 is a flow diagram illustrating an example process 600 for application management according to some implementations. In some examples, the process may be executed by the electronic device 102 or by another suitable computing device.

At 602, the electronic device may determine application information indicating that a first set of applications are installed on an electronic device and a second set of applications have been offloaded, at least in part, from the electronic device by removing, from the electronic device, at least one of an application file or application data generated, at least in part, by execution of the respective application file. As one example, the application may be uninstalled from the electronic device and the installable application file and application data may be saved at a network storage. Further, in some examples, saved application state information may also be saved at the network storage. In other examples, rather than uninstalling the application from the electronic device, the application file (e.g., an APK file) may be removed from the electronic device and saved to the network storage without uninstalling the application or application data. Further, if an OBB file or other assets are associated with the particular application, these may also be saved to the network storage and deleted from the electronic device. Thus, in some examples, the application data generated by execution of the application and saved application state information may remain on the electronic device, while one or more application files (e.g., the APK file and OBB file in the case of an ANDROID® OS) may be offloaded from the electronic device to the network storage without uninstalling the application from the electronic device.

At 604, the electronic device may present, on a display an application launcher UI including a first set of respective application representations corresponding to the first set of applications and a second set of respective application representations corresponding to the second set of applications. In some examples, the application launcher UI may present the respective application representations of the second set of representations with a graphical style to visually distinguish the second set of representations from the first set of representations.

At 606, in response to receiving a selection of one of the application representations of the second set via the application launcher UI, the electronic device may send a request to a computing device associated with a network storage for at least one of the application file of the selected application, the application data generated by the selected application, or previously saved state information for the selected application. In some cases, the application data and saved state information may have been retained on the electronic device, and the application file may have been uninstalled or otherwise offloaded without uninstalling. In other cases, the application file may have been uninstalled or otherwise offloaded without uninstalling the application, and the application data and/or saved state information may have also been offloaded to the network storage.

At 608, the electronic device may receive, from the computing device, at least one of the application file, the saved application state information, or application data previously saved to the network storage.

At 610, the electronic device may execute the application on the electronic device using, at least in part, the saved application state information and the application data. For example, the application state information may include at least one of: a value for a variable used by the application on the electronic device; a value saved for an application setting set on the electronic device; a graphic user interface configuration saved on the electronic device; or a value for a user input received on the electronic device.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 7:
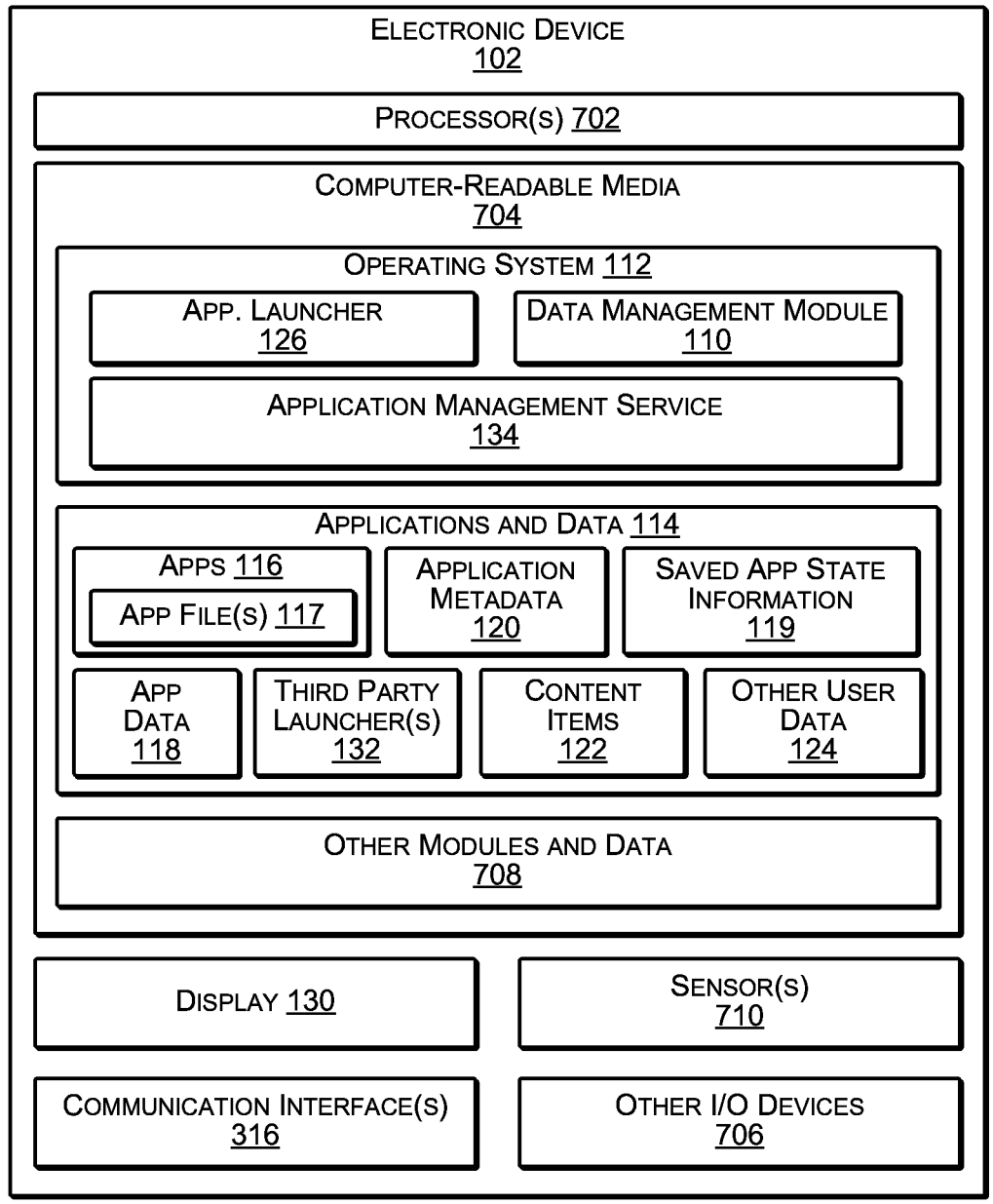
FIG. 7 illustrates select components of an example electronic device according to some implementations.

FIG. 7 illustrates select example components of the electronic device 102 that may implement the functionality described above according to some examples. The electronic device 102 may be any of a number of different types of computing devices, as enumerated above. In the example of FIG. 7, the electronic device 102 includes a plurality of components, such as at least one processor 702, one or more computer-readable media 704, the one or more communication interfaces 316, and one or more input/output (I/O) devices 706. Each processor 702 may itself comprise one or more processors or processing cores. For example, the processor 702 can be implemented as one or more microprocessors, microcomputers, microcontrollers, digital signal processors, central processing units, state machines, logic circuitries, and/or any devices that manipulate signals based on operational instructions. In some cases, the processor 702 may be one or more hardware processors and/or logic circuits of any suitable type specifically programmed or configured to execute the algorithms and processes described herein. The processor 702 can be configured to fetch and execute computer-readable processor-executable instructions stored in the computer-readable media 704.

Depending on the configuration of the electronic device 102, the computer-readable media 704 may be an example of tangible non-transitory computer storage media and may include volatile and nonvolatile memory and/or removable and non-removable media implemented in any type of technology for storage of information such as computer-readable instructions, data structures, program modules, or other data. The computer-readable media 704 may include, but is not limited to, RAM, ROM, EEPROM, flash memory, solid-state storage, magnetic disk storage, optical storage, and/or other computer-readable media technology. Further, in some cases, the electronic device 102 may access external storage, such as RAID storage systems, storage arrays, network attached storage, storage area networks, cloud storage, or any other medium that can be used to store information and that can be accessed by the processor 702 directly or through another computing device or network. Accordingly, the computer-readable media 704 may be computer storage media able to store instructions, modules, or components that may be executed by the processor 702. Further, when mentioned, non-transitory computer-readable media exclude media such as energy, carrier signals, electromagnetic waves, and signals per se.

The computer-readable media 704 may be used to store and maintain any number of functional components that are executable by the processor 702. In some implementations, these functional components comprise instructions or programs that are executable by the processor 702 and that, when executed, implement operational logic for performing the actions attributed above to the electronic device 102. Functional components of the electronic device 102 stored in the computer-readable media 704 may include the data management module 110, the application launcher 126, the application management service 134, as well as the applications 116, comprising application files 117, and the third party launcher(s) 132, if any. Additional functional components may include the operating system 112 for controlling and managing various functions of the electronic device 102 and for enabling basic user interactions with the electronic device 102. In some examples, the data management module 110 and/or the application launcher 126 may be one or more modules of the operating system 112, while in other examples, some or all of these modules may be separate from the operating system 112.

The computer-readable media 704 may store the application data 118, saved application state information 119, application metadata 120, content items 122, and other user data 124. In addition, depending on the type of the electronic device 102, the computer-readable media 704 may also store other functional components and data, such as other modules and data 708, which may include applications, programs, drivers, etc., and other data used or generated by the functional components. Further, the electronic device 102 may include many other logical, programmatic and physical components, of which those described are merely examples that are related to the discussion herein.

The communication interface(s) 316 may include one or more interfaces and hardware components for enabling communication with various other devices, such as over the network(s) 106 or directly. For example, communication interface(s) 316 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein.

FIG. 7 further illustrates that the electronic device 102 may include the display 130. Depending on the type of computing device used as the electronic device 102, the display 130 may employ any suitable display technology able to present digital content thereon. In some examples, the display 130 may have a touch sensor (not shown) associated with the display 130 to provide a touchscreen display configured to receive touch inputs for enabling interaction with a UI presented on the display 130. Accordingly, implementations herein are not limited to any particular display technology. Alternatively, in some examples, the electronic device 102 may not include a display.

The electronic device 102 may further include sensors 710, such as a GPS device, an accelerometer, gyroscope, compass, proximity sensor, and the like. The electronic device 102 may further include one or more other I/O devices 706. The I/O devices 706 may include speakers, a microphone, a camera, and various user controls (e.g., buttons, a joystick, a keyboard, a keypad, etc.), a haptic output device, and so forth. Additionally, the electronic device 102 may include various other components that are not shown, examples of which may include removable storage, a power source, such as a battery and power control unit, and so forth.

Figure 8:
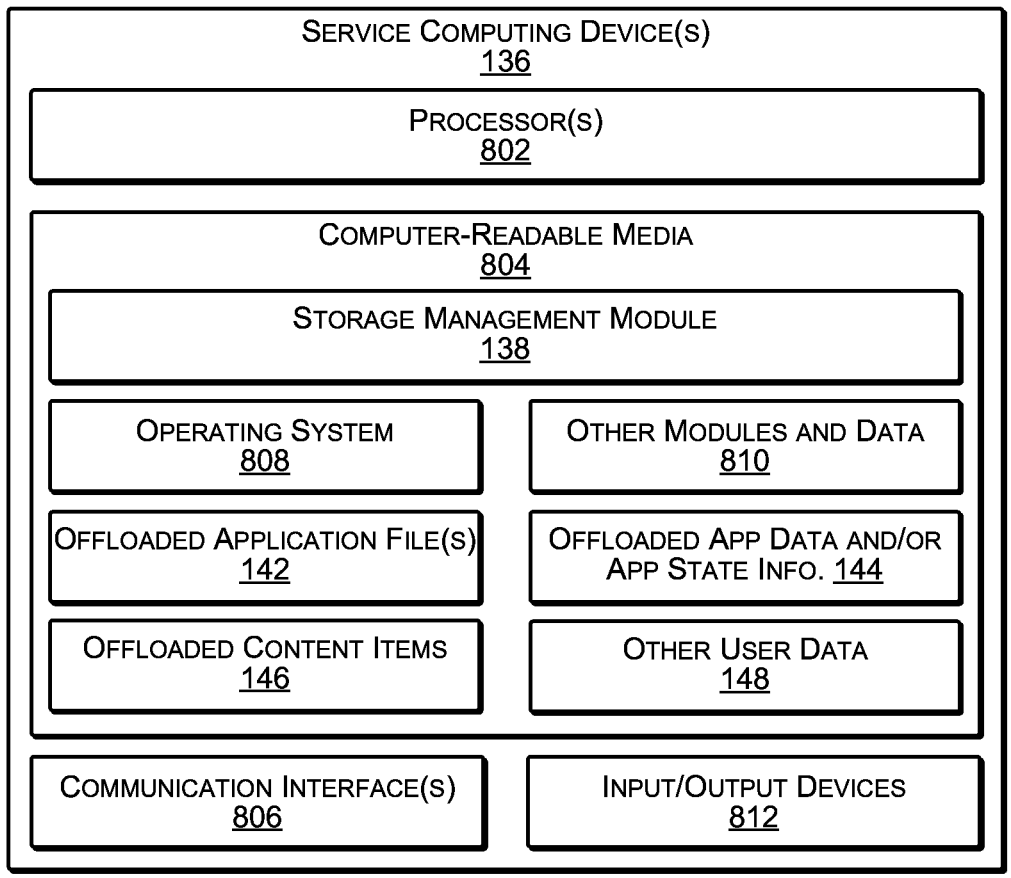
FIG. 8 illustrates select components of one or more example service computing devices according to some implementations.

FIG. 8 illustrates select components of the one or more service computing device(s) 136 that may be used to implement some functionality of the application management service described herein. In some examples, the service computing device 136 may be operated by a service provider that provides the network storage service, and may include one or more servers or other types of computing devices that may be embodied in any number of ways. For instance, in the case of a server, the modules, other functional components, and data storage (e.g., storage devices 140) may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 136 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 136 may be located together or separately, and organized, for example, as virtual servers, server banks, and/or server farms. The described functionality may be provided by the servers of a single entity or enterprise, or may be provided by the servers and/or services of multiple different buyers or enterprises.

In the illustrated example, each service computing device 136 may include, or may have associated therewith, one or more processors 802, one or more computer-readable media 804, and one or more communication interfaces 806. Each processor 802 may be a single processing unit or a number of processing units, and may include single or multiple computing units or multiple processing cores. The processor(s) 802 can be implemented as one or more microprocessors, microcomputers, microcontrollers, digital signal processors, central processing units, state machines, logic circuitries, and/or any devices that manipulate signals based on operational instructions. For instance, the processor(s) 802 may be one or more hardware processors and/or logic circuits of any suitable type specifically programmed or configured to execute the algorithms and processes described herein. The processor(s) 802 can be configured to fetch and execute computer-readable instructions stored in the computer-readable media 804, which can program the processor(s) 802 to perform the functions described herein.

The computer-readable media 804 may include the storage devices 140 discussed above with respect to FIG. 1 (not shown in FIG. 8). In some cases, the storage devices 140 may be at the same location as the service computing device(s) 136, while in other examples, the storage devices 140 may be remote from the service computing device(s) 136. The computer-readable media 804 may further include volatile and nonvolatile memory and/or removable and non-removable media implemented in any type of technology for storage of information, such as computer-readable instructions, data structures, program modules, or other data. Such computer-readable media 804 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 136, the computer-readable media 804 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 804 may be used to store any number of functional components that are executable by the processors 802. In many implementations, these functional components comprise instructions or programs that are executable by the processors 802 and that, when executed, specifically configure the one or more processors 802 to perform the actions attributed above to the service computing device 136. Functional components stored in the computer-readable media 804 may include the storage management module 138. Additional functional components stored in the computer-readable media 804 may include an operating system 808 for controlling and managing various functions of the service computing device 136.

In addition, the computer-readable media 804 may store data used for performing the functions and services described herein. Thus, the computer-readable media 804 may store the offloaded application files 142, the offloaded application data and/or saved application state information 144, the offloaded content items 146, and the other user data 148. The service computing device 136 may also include or maintain other functional components and data, such as other modules and data 810, which may include programs, drivers, etc., and the data used or generated by the functional components. Further, the service computing device 136 may include many other logical, programmatic, and physical components, of which those described above are merely examples that are related to the discussion herein.

The communication interface(s) 806 may include one or more interfaces and hardware components for enabling communication with various other devices, such as over the network(s) 106. For example, communication interface(s) 806 may enable communication through one or more of the Internet, cable networks, cellular networks, wireless networks (e.g., Wi-Fi) and wired networks, as well as short-range communications such as BLUETOOTH®, and the like, as additionally enumerated elsewhere herein.

The service computing device 136 may further be equipped with various input/output (I/O) devices 812. Such I/O devices 812 may include a display, various user interface controls (e.g., buttons, joystick, keyboard, mouse, touch screen, etc.), audio speakers, connection ports and so forth.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A electronic device comprising:
   one or more processors;
   a display coupled to the one or more processors; and
   one or more computer-readable media storing instructions executable by the one or more processors, wherein the instructions program the one or more processors to:
   save at least one of application state information or application data obtained, at least in part, from execution of an application on the electronic device;
   offload the application from the electronic device to a computing device over a network;
   present, on the display, an application launcher user interface (UI);

receive, via the application launcher UI, a selection of the offloaded application;

send a request to the computing device based on the selection of the application;

receive, over the network, an application file corresponding to the application;

onload the application on the electronic device; and execute the application on the electronic device in response, at least in part, to the selection of the application received via the application launcher UI.

2. The electronic device as recited in claim 1, wherein the instructions further program the one or more processors to present the application launcher UI with a first set of selectable application representations corresponding to a first set of applications that are installed on the electronic device, and a second set of selectable application representations corresponding to a second set of applications, including the selected application, that are offloaded from the electronic device.

3. The electronic device as recited in claim 2, wherein the instructions further program the one or more processors to present the application launcher UI with the respective application representations of the second set of representations including a graphical style to visually distinguish the second set of representations from the first set of representations.

4. The electronic device as recited in claim 1, wherein the instructions further program the one or more processors to, prior to saving the at least one of the application state information or the application data, install the application on the electronic device, wherein offloading the application from the electronic device comprises:
sending the application file for the application to the computing device over the network and at least one of:
uninstalling the application from the electronic device; or
deleting the application file from the electronic device.

5. The electronic device as recited in claim 1, wherein the instructions further program the one or more processors to maintain metadata for the offloaded application on the electronic device, the metadata including at least an application representation icon corresponding to the application and an identifier of the application.

6. The electronic device as recited in claim 1, wherein the instructions further program the one or more processors to onload the application by receiving the application file over the network and at least one of:
using the application file to reinstall the application on the electronic device; or
storing the application file on the electronic device to enable execution of the application without reinstalling the application.

7. The electronic device as recited in claim 1, wherein the instructions further program the one or more processors to:
prior to offloading the application, save the application state information from the execution of the application on the electronic device; and
subsequent to onloading the application, configure a state of the application based on the saved application state information.

8. A method comprising:
storing at least one of application data or application state information obtained from executing a first application on an electronic device;
offloading, by one or more processors of the electronic device, the first application from the electronic device by at least one of uninstalling the first application or deleting an application file corresponding to the first application;
presenting, by one or more processors, an application launcher user interface (UI) on a display associated with the electronic device, the application launcher UI including a first application representation corresponding to the first application offloaded from the electronic device, and a second application representation corresponding to a second application installed on the device;
presenting the application launcher UI including the first application representation presented with a graphical style to visually distinguish the first application representation from the second application representation based at least in part on the first application being offloaded from the electronic device;
in response to receiving a selection of the first application representation via the application launcher UI, sending a request to a network storage for the application file; and
receiving, by one or more processors, the application file from the network storage.

9. The method as recited in claim 8, wherein presenting the application launcher UI comprises presenting the application launcher UI based at least in part on selection of a content item, wherein the first and second application representations presented in the application launcher UI correspond to applications configured to perform a respective function with respect to the content item.

10. The method as recited in claim 8, further comprising:
in response to receiving the selection of the first application representation via the application launcher UI, using an application programming interface to send an instruction for executing the first application; and
based at least in part on determining that the first application is offloaded from the electronic device, sending the request to the network storage for the application file corresponding to the first application.

11. The method as recited in claim 8, further comprising, prior to storing the at least one of the application data or the application state information, installing the first application on the electronic device, wherein onloading the application to the electronic device comprises:
using the application file to reinstall the application on the electronic device; or
storing the application file on the electronic device to enable execution of the application without reinstalling the application.

12. The method as recited in claim 8, further comprising offloading the first application from the electronic device based at least in part on at least one of:
an amount of time since the first application was last accessed on the electronic device;
a frequency with which the first application was accessed over a period of time;
an amount of storage space consumed by the first application file; or
an amount of available storage space remaining on the electronic device.

13. The method as recited in claim 8, further comprising:
storing the application state information on at least one of the electronic device or the network storage; and
subsequent to onloading the application file, configuring a state of the first application based on the application state information.

14. One or more non-transitory computer-readable media maintaining instructions that, when executed by one or more processors of an electronic device, program the one or more processors to:
- determine application information indicating that a first set of applications are installed on the electronic device and a second set of applications have been offloaded, at least in part, from the electronic device;
- present, on the display, based at least in part on the application information, an application launcher user interface (UI) including a first set of respective application representations corresponding to the first set of applications and a second set of respective application representations corresponding to the second set of applications; and
- in response to receiving a selection of one of the application representations of the second set via the application launcher UI, send a request to a computing device for at least one of:
- an application file corresponding to the selected application representation; or
- application data generated by the application corresponding to the selected application representation,
- wherein the instructions further program the one or more processors to present the application launcher UI with the respective application representations of the second set of representations with a graphical style to visually distinguish the second set of representations from the first set of representations based at least in part on the second set of applications being offloaded from the electronic device.

15. The one or more non-transitory computer-readable media as recited in claim 14, wherein the instructions further program the one or more processors to present the application launcher UI based at least in part on selection of a content item, wherein the first set of application representations and the second set of application representations presented in the application launcher UI correspond to applications configured to perform a respective function with respect to the content item.

16. The one or more non-transitory computer-readable media as recited in claim 14, wherein the instructions further program the one or more processors to:
- in response to receiving the selection of the application representation via the application launcher UI, using an application programming interface to send an instruction for executing the application corresponding to the selected application representation; and
- based at least in part on determining that the application is offloaded from the electronic device, send the request to the computing device for the application file corresponding to the selected application representation.

17. The one or more non-transitory computer-readable media as recited in claim 14, wherein the instructions further program the one or more processors to:
- prior to offloading the application, saving application state information following execution of the application on the electronic device; and
- in response to receiving the selection of the application representation via the application launcher UI, onload the application and execute the application on the electronic device based at least in part on the saved application state information.

18. The one or more non-transitory computer-readable media as recited in claim 17, wherein the instructions further program the one or more processors to save the application state information by saving at least one of:
- a value for a variable used by the application on the electronic device;
- a value saved for an application setting set on the electronic device;
- a graphic user interface configuration saved on the electronic device; or
- a value for a user input received on the electronic device.

* * * * *